(12) United States Patent
Fang et al.

(10) Patent No.: US 12,738,610 B2
(45) Date of Patent: Sep. 15, 2026

(54) BATTERY CELL, METHOD AND SYSTEM FOR MANUFACTURE SAME, BATTERY, AND POWER CONSUMING DEVICE

(71) Applicant: CONTEMPORARY AMPEREX TECHNOLOGY (HONG KONG) LIMITED, Hong Kong (CN)

(72) Inventors: Kun Fang, Ningde (CN); Zhijun Guo, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/343,767

(22) Filed: Jun. 29, 2023

(65) Prior Publication Data

US 2023/0402684 A1 Dec. 14, 2023

Related U.S. Application Data

(63) Continuation of application No. PCT/CN2021/114156, filed on Aug. 23, 2021.

(51) Int. Cl.
*H01M 50/107* (2021.01)
*H01M 10/04* (2006.01)
(Continued)

(52) U.S. Cl.
CPC ..... *H01M 50/559* (2021.01); *H01M 10/0431* (2013.01); *H01M 50/107* (2021.01);
(Continued)

(58) Field of Classification Search
None
See application file for complete search history.

(56) References Cited

U.S. PATENT DOCUMENTS 5,677,078 A 10/1997 Juergens et al.
2002/0110729 A1* 8/2002 Hozumi ............ H01M 10/0431 429/211
(Continued)

FOREIGN PATENT DOCUMENTS

CN 1283879 A 2/2001
CN 101083339 A 12/2007
(Continued)

OTHER PUBLICATIONS

Notice of Reasons for Refusal received in the counterpart Japanese application 2022-567125 mailed on Dec. 12, 2023.
(Continued)

*Primary Examiner* — Amanda J Barrow
(74) *Attorney, Agent, or Firm* — K&L Gates LLP

(57) ABSTRACT

The present application provides a battery cell, a method and system for manufacturing the battery cell, a battery, and a power consuming device. The battery cell according to an embodiment of the present application comprises: an electrode assembly comprising a first tab, wherein the first tab is arranged around a central axis of the electrode assembly; a housing configured to accommodate the electrode assembly, wherein the housing comprises a barrel and a cover connected to the barrel, the barrel is arranged around a periphery of the electrode assembly, the cover is provided with an electrode lead-out hole, the central axis extends in a first direction and passes through the electrode lead-out hole, the first tab comprises a first annular portion, the first annular portion is arranged opposite to the cover.

18 Claims, 10 Drawing Sheets

(51) Int. Cl.

| | |
|---|---|
| ***H01M 50/152*** | (2021.01) |
| ***H01M 50/169*** | (2021.01) |
| ***H01M 50/179*** | (2021.01) |
| ***H01M 50/186*** | (2021.01) |
| ***H01M 50/213*** | (2021.01) |
| ***H01M 50/507*** | (2021.01) |
| ***H01M 50/533*** | (2021.01) |
| ***H01M 50/536*** | (2021.01) |
| ***H01M 50/559*** | (2021.01) |
| ***H01M 50/56*** | (2021.01) |
| ***H01M 50/566*** | (2021.01) |
| ***H01M 50/636*** | (2021.01) |

(52) U.S. Cl.

CPC ....... *H01M 50/152* (2021.01); *H01M 50/169* (2021.01); *H01M 50/179* (2021.01); *H01M 50/186* (2021.01); *H01M 50/213* (2021.01); *H01M 50/507* (2021.01); *H01M 50/533* (2021.01); *H01M 50/536* (2021.01); *H01M 50/56* (2021.01); *H01M 50/566* (2021.01); *H01M 50/636* (2021.01); *H01M 2220/20* (2013.01)

(56) References Cited

U.S. PATENT DOCUMENTS

| | | | | |
|---|---|---|---|---|
| 2003/0211388 | A1 | 11/2003 | Ruth et al. | |
| 2004/0128826 | A1 | 7/2004 | Nakanishi et al. | |
| 2007/0117011 | A1 | 5/2007 | Myerberg et al. | |
| 2008/0057394 | A1 | 3/2008 | Rigobert et al. | |
| 2009/0087733 | A1* | 4/2009 | Yoon | H01M 50/171 429/246 |
| 2010/0310925 | A1 | 12/2010 | Lee | |
| 2011/0244316 | A1 | 10/2011 | Rigobert et al. | |
| 2012/0258355 | A1 | 10/2012 | Guen | |
| 2014/0087226 | A1* | 3/2014 | Mishiro | H01M 50/536 429/94 |
| 2016/0104914 | A1 | 4/2016 | Lee et al. | |
| 2018/0108899 | A1 | 4/2018 | Fees et al. | |
| 2019/0273266 | A1 | 9/2019 | Mark | |
| 2020/0035959 | A1 | 1/2020 | Yang et al. | |
| 2020/0144584 | A1 | 5/2020 | Zeng et al. | |
| 2020/0176750 | A1 | 6/2020 | Funami et al. | |
| 2021/0013556 | A1 | 1/2021 | Liu et al. | |
| 2021/0257704 | A1 | 8/2021 | Sawada et al. | |
| 2022/0200108 | A1* | 6/2022 | Kim | H01M 10/0422 |
| 2023/0216115 | A1 | 7/2023 | Okuno et al. | |
| 2023/0335868 | A1 | 10/2023 | Wang et al. | |
| 2023/0344097 | A1* | 10/2023 | Chai | H01M 50/107 |
| 2024/0145783 | A1* | 5/2024 | Lee | H01M 50/538 |
| 2024/0154218 | A1* | 5/2024 | Zhou | H01M 50/186 |
| 2024/0266611 | A1 | 8/2024 | Hwangbo et al. | |

FOREIGN PATENT DOCUMENTS

| | | | | | |
|---|---|---|---|---|---|
| CN | 101978530 | A | | 2/2011 | |
| CN | 202487702 | U | | 10/2012 | |
| CN | 102867936 | A | | 1/2013 | |
| CN | 101834306 | B | | 4/2014 | |
| CN | 204067497 | U | | 12/2014 | |
| CN | 104659317 | A | | 5/2015 | |
| CN | 105826489 | A | | 8/2016 | |
| CN | 206584968 | U | | 10/2017 | |
| CN | 206619636 | U | | 11/2017 | |
| CN | 207800665 | U | | 8/2018 | |
| CN | 207818750 | U | | 9/2018 | |
| CN | 208111590 | U | | 11/2018 | |
| CN | 208336334 | U | | 1/2019 | |
| CN | 208862040 | U | | 5/2019 | |
| CN | 109904379 | A | | 6/2019 | |
| CN | 209183657 | U | | 7/2019 | |
| CN | 209200018 | U | | 8/2019 | |
| CN | 209249497 | U | | 8/2019 | |
| CN | 209447912 | U | | 9/2019 | |
| CN | 209472008 | U | | 10/2019 | |
| CN | 110534690 | A | | 12/2019 | |
| CN | 209880722 | U | | 12/2019 | |
| CN | 210129548 | U | | 3/2020 | |
| CN | 111106304 | A | | 5/2020 | |
| CN | 111403639 | A | | 7/2020 | |
| CN | 111430588 | A | | 7/2020 | |
| CN | 111613739 | A | | 9/2020 | |
| CN | 112072058 | A | | 12/2020 | |
| CN | 112151732 | A | | 12/2020 | |
| CN | 112271412 | A | | 1/2021 | |
| CN | 112310574 | A | | 2/2021 | |
| CN | 112335117 | A | | 2/2021 | |
| CN | 112510326 | A | | 3/2021 | |
| CN | 212783705 | U | | 3/2021 | |
| CN | 112751020 | A | | 5/2021 | |
| CN | 112821015 | A | | 5/2021 | |
| CN | 112909445 | A | | 6/2021 | |
| CN | 213401445 | U | | 6/2021 | |
| CN | 113258124 | A | | 8/2021 | |
| CN | 213905545 | U | | 8/2021 | |
| CN | 113555602 | A | | 10/2021 | |
| CN | 215578764 | | * | 1/2022 | H01M 50/147 |
| CN | 215578764 | U | | 1/2022 | |
| CN | 215988974 | | * | 3/2022 | H01M 50/20 |
| CN | 215988974 | U | | 3/2022 | |
| CN | 215989125 | U | | 3/2022 | |
| CN | 218586157 | U | | 3/2023 | |
| CN | 218769959 | | * | 3/2023 | H01M 50/172 |
| CN | 218769959 | U | | 3/2023 | |
| EP | 4152492 | A1 | | 3/2023 | |
| JP | S63127990 | A | | 5/1988 | |
| JP | H11149915 | A | | 6/1999 | |
| JP | H11339769 | A | | 12/1999 | |
| JP | 2000200597 | A | | 7/2000 | |
| JP | 2000331656 | A | | 11/2000 | |
| JP | 2001256954 | A | | 9/2001 | |
| JP | 2001345084 | A | | 12/2001 | |
| JP | 2003187859 | A | | 7/2003 | |
| JP | 2003272600 | A | | 9/2003 | |
| JP | 2004362956 | A | | 12/2004 | |
| JP | 2005129488 | A | | 5/2005 | |
| JP | 2006004778 | A | | 1/2006 | |
| JP | 2006228520 | A | | 8/2006 | |
| JP | 2007265846 | A | | 10/2007 | |
| JP | 2009522714 | A | | 6/2009 | |
| JP | 2009289654 | A | | 12/2009 | |
| JP | 2010080081 | A | | 4/2010 | |
| JP | 2011076786 | A | | 4/2011 | |
| JP | 2012043714 | A | | 3/2012 | |
| JP | 2012124007 | A | | 6/2012 | |
| JP | 2013122936 | A | | 6/2013 | |
| JP | 2014207095 | A | | 10/2014 | |
| JP | 2015099681 | A | | 5/2015 | |
| JP | 2016225014 | A | | 12/2016 | |
| JP | 2017084540 | A | | 5/2017 | |
| JP | 2018206474 | A | | 12/2018 | |
| JP | 2019040678 | A | | 3/2019 | |
| JP | 2023529119 | A | | 7/2023 | |
| KR | 20060130529 | A | | 12/2006 | |
| KR | 20080017506 | A | | 2/2008 | |
| KR | 20120062254 | A | | 6/2012 | |
| KR | 20140079031 | A | | 6/2014 | |
| KR | 20160008272 | A | | 1/2016 | |
| KR | 20160085601 | A | | 7/2016 | |
| KR | 20160120996 | A | | 10/2016 | |
| KR | 20190098495 | A | | 8/2019 | |
| KR | 102283792 | B1 | | 8/2021 | |
| WO | 2001024206 | A1 | | 4/2001 | |
| WO | 2006035597 | A1 | | 4/2006 | |
| WO | 2012161302 | A1 | | 11/2012 | |
| WO | 2017175362 | A1 | | 10/2017 | |
| WO | 2019148662 | A1 | | 8/2019 | |
| WO | 2020111275 | A1 | | 6/2020 | |
| WO | 2022184081 | A1 | | 9/2022 | |

(56) References Cited

FOREIGN PATENT DOCUMENTS

| | | | | |
|---|---|---|---|---|
| WO | 2022191683 A1 | | 9/2022 | |
| WO | WO 2023 025104 | * | 3/2023 | ............ H01M 10/04 |
| WO | WO 2023 025108 | * | 3/2023 | .......... H01M 50/553 |

OTHER PUBLICATIONS

Notice of Reasons for Refusal received in the counterpart Japanese application 2023-529132 mailed on Nov. 14, 2023.
Notice of Reasons for Refusal received in the counterpart Japanese application 2023-530876 mailed on Jul. 1, 2024.
The extended European search report received in the counterpart European application 21876743.2, mailed on Feb. 1, 2023.
The extended European search report received in the counterpart European application 21939994.6, mailed on Aug. 8, 2023.
Notification to Grant Patent Right for Invention received in the counterpart Chinese application 202180024771.2, issued on Oct. 16, 2023.
The international search report received in the counterpart international application PCT/CN2022/114036, mailed on Nov. 2, 2022.
The international search report received in the counterpart international application PCT/CN2022/114037, mailed on Oct. 26, 2022.
International Search Report received in the corresponding International Application PCT/CN2021/114155, mailed May 17, 2022.
International Search Report received in the corresponding International Application PCT/CN2021/114156, mailed Mar. 31, 2022.
International Search Report received in the corresponding International Application PCT/CN2021/114022, mailed Oct. 24, 2022.
Notice of Reasons for Refusal received in the corresponding Japanese Application 2023-530876, mailed on Dec. 18, 2024.
Notice of Reasons for Refusal received in the corresponding Japanese Application 2023-531097, mailed on Dec. 19, 2024.
Written Decision on Registration received in the corresponding Korean Application 10-2022-7038597, mailed on Nov. 18, 2024.
Request for the Submission of an Opinion received in the corresponding Korean Application 10-2022-7038597, mailed on Sep. 10, 2024.
International Search Report received in the corresponding International Application PCT/CN2021/114154, mailed on May 27, 2022.
Office Action received in the corresponding U.S. Appl. No. 17/715,076, mailed on Nov. 6, 2024.
Office Action received in the corresponding U.S. Appl. No. 18/181,545, mailed on Oct. 2, 2024.
The extended European search report received in the counterpart European application 22860450.0, mailed on Mar. 27, 2025.
Notice of Allowance (with English Machine Translation), mailed Jul. 25, 2025, for Chinese Patent Application Serial No. 202180081099.0.
Notice of Allowance (with English Machine Translation), mailed Sep. 29, 2025, for Chinese Patent Application Serial No. 202280007865.3.
Notice of Allowance (with English Machine Translation), mailed Jul. 14, 2025, for Chinese Patent Application Serial No. 202280007871.9.
Notice of Allowance (with English Machine Translation), mailed Aug. 27, 2025, for Chinese Patent Application Serial No. 202311728665.X.
Office Action (with English Machine Translation), mailed May 20, 2025, for Japanese Patent Application Serial No. 2024-102206.
Office Action (with English Machine Translation), mailed Jun. 26, 2025, for Korean Patent Application Serial No. 10-2023-7017414.
Office Action (with English Machine Translation), mailed Jul. 4, 2025, for Korean Patent Application Serial No. 10-2023-7017462.
Notice of Allowance (with English Machine Translation), mailed Dec. 19, 2025, for Korean Patent Application Serial No. 10-2022-7038353.
Non-Final Office Action, mailed Dec. 8, 2025, for U.S. Appl. No. 17/715,076.
Notice of Allowance, mailed Dec. 23, 2025, for U.S. Appl. No. 18/360,780.
Office Action (with English Machine Translation), mailed Nov. 3, 2025, for Chinese Patent Application Serial No. 202180081084.4.

* cited by examiner

6

BATTERY CELL, METHOD AND SYSTEM FOR MANUFACTURE SAME, BATTERY, AND POWER CONSUMING DEVICE

CROSS-REFERENCE TO RELATED APPLICATIONS

This application is a continuation of International Application PCT/CN2021/114156, filed Aug. 23, 2021 and entitled "BATTERY CELL, METHOD AND SYSTEM FOR MANUFACTURE SAME, BATTERY, AND POWER CONSUMING DEVICE", which is incorporated herein by reference in its entirety.

TECHNICAL FIELD

The present application relates to the technical field of batteries, and in particular, to a battery cell, a method and system for manufacturing same, a battery, and a power consuming device.

BACKGROUND ART

Battery cells are widely used in electronic devices, such as a mobile phone, a notebook computer, an electromobile, an electric vehicle, an electric airplane, an electric ship, an electric toy car, an electric toy ship, an electric toy airplane, and an electric tool. The battery cells may comprise a nickel-cadmium battery cell, a nickel-hydrogen battery cell, a lithium-ion battery cell, a secondary alkaline zinc-manganese battery cell, etc.

In development of battery technology, how to improve an overcurrent capability of battery cells is an urgent technical problem to be solved in the battery technology.

SUMMARY OF THE INVENTION

The present application provides a battery cell, a method and system for manufacturing the battery cell, a battery, and a power consuming device, in which the overcurrent capability of the battery cell can be improved.

According to a first aspect, an embodiment of the present application provides a battery cell, comprising:

an electrode assembly comprising a first tab, wherein the first tab is arranged around a central axis of the electrode assembly;

a housing configured to accommodate the electrode assembly, wherein the housing comprises a barrel and a cover connected to the barrel, the barrel is arranged around a periphery of the electrode assembly, the cover is provided with an electrode lead-out hole, the central axis extends in a first direction and passes through the electrode lead-out hole, the first tab comprises a first annular portion, the first annular portion is arranged opposite to the cover, and a projection of the first annular portion in the first direction does not overlap with a projection of the electrode lead-out hole in the first direction;

an electrode terminal installed in the electrode lead-out hole; and a current collecting member which is at least partially located between the cover and the first annular portion, wherein the current collecting member is configured to connect the first annular portion to the electrode terminal in such a way that the first tab is electrically connected to the electrode terminal.

In the foregoing solution, the current collecting member is arranged to connect the electrode terminal to the first annular portion of the first tab, such that currents in the electrode assembly can flow to the electrode terminal through the first annular portion and the current collecting member, thereby shortening a conductive path and improving the overcurrent capability and charging efficiency of the battery cell.

In some embodiments, the central axis coincides with an axis of the electrode lead-out hole. The electrode lead-out hole is roughly provided in the middle of the cover, and correspondingly, the electrode terminal is also installed on the middle of the cover. When a plurality of battery cells are assembled into sets, a requirement for positioning precision of the electrode terminal can be reduced, which simplifies an assembly process.

In some embodiments, the first annular portion is welded to the current collecting member to form a first welded portion. The first welded portion can reduce contact resistance between the current collecting member and the first annular portion and improve the overcurrent capability.

In some embodiments, a cross section of the first tab perpendicular to the first direction is annular. The first tab has an outer radius R, a minimum distance D between the first welded portion and the central axis in a second direction is provided, and R and D meet: $0.2 \leq D/R \leq 0.8$, wherein the second direction is a radial direction of the first tab.

In the foregoing solution, values of D and R are set to meet $0.2 \leq D/R \leq 0.8$, which can reduce a difference of current paths between portions of the first tab at different positions and the electrode terminal, improve the uniformity of the current density of a first electrode plate of the electrode assembly, reduce the internal resistance, and improve the overcurrent capability.

In some embodiments, the first welded portion is annular and is arranged around the central axis. The annular first welded portion has a relatively large overcurrent area which can improve the uniformity of the current density of the first electrode plate, reduce the internal resistance, and improve the overcurrent capability.

In some embodiments, a plurality of first welded portions are provided, and the plurality of first welded portions are spaced in a circumferential direction of the first annular portion. The plurality of first welded portions can increase the overcurrent area, which improves the uniformity of the current density of the first electrode plate, reduces the internal resistance, and improves the overcurrent capability.

In some embodiments, the current collecting member is provided with a bump on a side facing the first tab, and the bump is welded to the first annular portion to form the first welded portion. The bump can be better attached to the first annular portion, reducing the risk of poor welding.

In some embodiments, the first tab further comprises a second annular portion which is arranged opposite to the electrode lead-out hole in the first direction, and the first annular portion surrounds the outside of the second annular portion. At least a part of the second annular portion abuts against the current collecting member.

In the foregoing solution, the provision of the second annular portion can improve the overcurrent capability. The second annular portion can also support the first annular portion in the radial direction to reduce the risk of crushing deformation of the first annular portion and improve the stability of welding of the first annular portion and the current collecting member when the first annular portion is welded to the current collecting member.

In some embodiments, the electrode terminal comprises a terminal body, and the terminal body is provided with a first recess. The terminal body is formed with a connecting portion at the bottom of the first recess, and the connecting portion is welded to the current collecting member to form a second welded portion.

In the foregoing solution, the provision of the first recess reduces the thickness of the connecting portion, which can reduce the welding power required for welding the connecting portion to the current collecting member, reduce heat generation, and reduce the risk of other members being burned.

In some embodiments, the connecting portion is provided with a stress relief structure which is configured to release stresses when the connecting portion is welded to the current collecting member. In this embodiment, the stresses are released by providing the stress relief structure, thereby reducing the risk of deformation and cracking of the connecting portion during welding, and ensuring the connection strength between the connecting portion and the current collecting member.

In some embodiments, the connecting portion is provided with a first through hole for communicating a space on a side of the connecting portion which faces away from the electrode assembly with an interior space of the housing. When the connecting portion is welded to the current collecting member, the first through hole can function to release welding stresses and reduce the risk of cracking of the connecting portion. The first through hole can be also used for procedures such as liquid injection and gas extraction.

In some embodiments, the first through hole is used to inject an electrolyte into the interior space of the housing.

In some embodiments, the current collecting member is provided with a second through hole, and the second through hole is configured to be arranged opposite to the first through hole such that the electrolyte is capable of flowing into the interior space of the housing through the second through hole.

In the foregoing solution, the second through hole opposite to the first through hole is provided in the current collecting member, such that the blocking of the electrolyte by the current collecting member during the liquid injection can be reduced, and the electrolyte can flow into the housing smoothly, thereby improving the efficiency of infiltrating the electrode assembly.

In some embodiments, a projection of the first through hole in the first direction is located within a projection of the second through hole in the first direction. In this embodiment, the current collecting member can be prevented from blocking the first through hole in the first direction, such that the electrolyte can smoothly flow into the housing.

In some embodiments, the electrode assembly is of a wound structure, the electrode assembly is provided with a third through hole at a winding center, the third through hole runs through the electrode assembly in the first direction, and the third through hole is arranged opposite to the first through hole and the second through hole in the first direction, such that the electrolyte is capable of flowing to the interior of the electrode assembly through the third through hole. The electrolyte can flow into the third through hole through the first through hole and the second through hole, and the electrolyte flowing into the third through hole can infiltrate the electrode assembly from inside, thereby improving the efficiency of infiltrating the electrode assembly.

In some embodiments, the projection of the second through hole in the first direction is located within a projection of the third through hole in the first direction. In this embodiment, the blocking of the second through hole by the first tab can be reduced, and the electrolyte can smoothly flow into the third through hole.

In some embodiments, the connecting portion comprises a groove, a bottom wall of the groove is formed with the second welded portion, and the groove is configured to be recessed from a first outer surface of the connecting portion in a direction toward the electrode assembly such that a gap is formed between the first outer surface and the bottom wall of the groove.

During producing the battery cell, an external device may cooperate with the connecting portion. A surface of the second welded portion is uneven, and if the external device presses against the second welded portion, the external device is prone to being crushed by the second welded portion. In this embodiment, the groove is provided to form the gap between the first outer surface and the bottom wall of the groove. In this way, the first outer surface can be used to support the external device, so as to separate the external device from the second welded portion, and to reduce the risk of the external device being crushed.

In some embodiments, the terminal body comprises a columnar portion, a first limiting portion, and a second limiting portion, wherein the columnar portion is at least partially located in the electrode lead-out hole, the first recess is arranged in the columnar portion, the first limiting portion and the second limiting portion are both connected to and protrude from a lateral wall of the columnar portion, and the first limiting portion and the second limiting portion are respectively arranged on an outer side and an inner side of the cover in the first direction, and are configured to clamp a part of the cover. The first limiting portion and the second limiting portion clamp a part of the cover from two sides to fix the terminal body to the cover.

In some embodiments, the battery cell further comprises a first insulating member and a second insulating member, the first insulating member being at least partially arranged between the first limiting portion and the cover, and the second insulating member being at least partially arranged between the second limiting portion and the cover. The first insulating member and the second insulating member are configured to insulate and isolate the terminal body from the cover.

In some embodiments, the first insulating member and the second insulating member are of an integrally formed structure; or the first insulating member and the second insulating member are provided separately and abut against each other.

In some embodiments, one of the first insulating member and the second insulating member is configured to seal the electrode lead-out hole.

In some embodiments, a periphery of the first limiting portion is provided with a plurality of protruding structures, and the plurality of protruding structures are spaced in a circumferential direction of the columnar portion. The provision of the groove structures and the protruding structures reduces the difficulty in folding over the first limiting portion and reduces stress concentration on the first limiting portion.

In some embodiments, the first limiting portion has an edge-folded structure formed by outwardly folding over an end portion of the terminal body which faces away from the electrode assembly.

In some embodiments, the second limiting portion has a limiting structure which is formed by pressing an end portion of the terminal body facing the electrode assembly to outwardly extend the end portion of the terminal body facing the electrode assembly.

In some embodiments, the terminal body has a second outer surface and a second inner surface which are oppositely arranged in the first direction, and the first recess is recessed from a second outer surface to a first outer surface of the connecting portion in a direction toward the electrode assembly.

In some embodiments, the electrode terminal further comprises a sealing plate which is connected to the terminal body and which closes the opening of the first recess. The sealing plate can protect the connecting portion from the outside, reduce external impurities entering the first recess, reduce the risk of the connecting portion being damaged by the external impurities, and improve the sealing performance of the battery cell.

In some embodiments, a stepped surface is provided on a side wall of the first recess, at least a part of the sealing plate is accommodated in the first recess, and the stepped surface is used to support the sealing plate.

When the sealing plate is assembled, the stepped surface can support the sealing plate and position the sealing plate, thereby simplifying an assembly process. The at least a part of the sealing plate is accommodated in the first recess, which can reduce an overall size of the electrode terminal, reduce a space occupied by the electrode terminal, and increase energy density.

In some embodiments, a gap is provided between the sealing plate and the connecting portion for avoiding the second welded portion. In this embodiment, the gap is provided between the sealing plate and the connecting portion to enable the sealing plate to avoid the second welded portion and prevent the sealing plate from being in direct contact with the second welded portion, thereby reducing wobbles of the sealing plate during assembly and ensuring the sealing effect.

In some embodiments, the connecting portion is arranged at the end of the terminal body facing the electrode assembly, and the first inner surface of the connecting portion is flush with the second inner surface.

In some embodiments, the terminal body further comprises a second recess, and the second recess is recessed from the second inner surface to the first inner surface of the connecting portion in a direction away from the electrode assembly.

In the embodiments of the present application, the provision of both the first recess and the second recess reduces the thickness of the connecting portion, which can reduce requirements for the depth of the first recess and simplify a forming process. The provision of the second recess may also increase the interior space of the battery cell, thereby increasing the energy density.

In some embodiments, the current collecting member comprises a terminal connecting portion and a tab connecting portion surrounding the outside of the terminal connecting portion, the terminal connecting portion protruding relative to the tab connecting portion and extending into the second recess in such a way that the top of the terminal connecting portion abuts against the first inner surface of the connecting portion.

In some embodiments, the terminal body has a second outer surface and a second inner surface which are oppositely arranged in the first direction, and the first recess is recessed from the second inner surface to the first inner surface of the connecting portion in the direction away from the electrode assembly.

In the foregoing solution, the first recess is provided on an inner side of the terminal body, which can ensure the flatness and area of the second outer surface and facilitate connection of the terminal body to an external busbar component. The provision of the first recess on the inner side of the terminal body can also increase the interior space of the battery cell, thereby increasing the energy density.

In some embodiments, the current collecting member comprises a terminal connecting portion and a tab connecting portion surrounding the outside of the terminal connecting portion, the terminal connecting portion protruding relative to the tab connecting portion and extending into the first recess in such a way that the top of the terminal connecting portion abuts against the first inner surface of the connecting portion.

In some embodiments, the terminal body has a second outer surface and a second inner surface which are oppositely arranged in the first direction, and the first recess is recessed from a second outer surface to a first outer surface of the connecting portion in a direction toward the electrode assembly. The electrode terminal further comprises a sealing plate which is connected to the terminal body and which closes the opening of the first recess, and the sealing plate is configured to be welded to a busbar component of a battery to form a third welded portion. The third welded portion can reduce contact resistance between the sealing plate and the busbar component and improve the overcurrent capability.

In some embodiments, at least a part of the sealing plate protrudes from the second outer surface of the terminal body. The at least a part of the sealing plate protrudes from the second outer surface to prevent the second outer surface from interfering with the attachment between the sealing plate and the busbar component and to ensure close attachment of the busbar component to the sealing plate.

In some embodiments, at least a part of the sealing plate is accommodated in the first recess, and the side wall of the first recess is provided with a stepped surface for supporting the sealing plate. The sealing plate is welded to the side wall of the first recess to form a fourth welded portion, and the fourth welded portion is configured to seal the opening of the first recess.

In the foregoing solution, the fourth welded portion surrounds the entire periphery of the sealing plate to seal the gap between the sealing plate and the side wall of the first recess and to improve the sealing performance of the battery cell.

In some embodiments, the third welded portion is entirely located in a region enclosed by the fourth welded portion. In this embodiment, when the busbar component is welded to the sealing plate, an intersection of the third welded portion with the fourth welded portion can be avoided to reduce the risk of pseudo soldering.

In some embodiments, the cover and the barrel are of an integrally formed structure. This allows procedures for connecting the cover to the barrel to be omitted.

In some embodiments, the electrode assembly further comprises a second tab which is arranged around the central axis of the electrode assembly. The first tab and the second tab are respectively arranged at two ends of the electrode assembly in the first direction. The barrel is configured to connect the second tab to the cover in such a way that the second tab is electrically connected to the cover.

In the foregoing solution, the cover and the electrode terminal have different polarities. In this case, one of the cover and the electrode terminal may be act as a positive output electrode of the battery cell, and the other may act as a negative output electrode of the battery cell. In this embodiment, the positive output electrode and the negative output electrode are arranged on the same side of the battery cell, which can simplify a process of connecting the plurality of battery cells.

In some embodiments, the second tab is a negative tab, and a bulk material of the housing is steel. The housing is electrically connected to the negative tab, i.e., the housing is in a low potential state. The housing of steel is not prone to corrosion by the electrolyte in the low potential state.

In some embodiments, the barrel has an opening at an end facing away from the cover, and the battery cell further comprises a cover plate for closing the opening.

According to a second aspect, an embodiment of the present application provides a battery, comprising a plurality of battery cells according to any one of the embodiments of the first aspect and busbar components, wherein the busbar components are configured to electrically connect at least two of the battery cells.

According to a third aspect, an embodiment of the present application provides a power consuming device, comprising a battery according to the second aspect, wherein the battery is configured to provide electric energy.

According to a fourth aspect, an embodiment of the present application provides a method for manufacturing a battery cell, comprising:

- providing a housing and a terminal body, wherein the housing comprises a barrel and a cover connected to the barrel, the barrel has an opening at an end facing away from the cover, and the cover is provided with an electrode lead-out hole in which the terminal body is installed;
- providing an electrode assembly, wherein the electrode assembly comprises a first tab, the first tab is arranged around a central axis of the electrode assembly, and the first tab comprises a first annular portion;
- providing a current collecting member and connecting the current collecting member to the first annular portion;
- installing the electrode assembly and the current collecting member into the housing and connecting the current collecting member to the terminal body in such a way that the first tab is electrically connected to the terminal body; and
- providing a cover plate and connecting the cover plate to the barrel to close the opening of the barrel;

The barrel is arranged around a periphery of the electrode assembly, the central axis extends in a first direction and passes through the electrode lead-out hole, the first annular portion is arranged opposite to the cover, a projection of the first annular portion in the first direction does not overlap with a projection of the electrode lead-out hole in the first direction, and the current collecting member is at least partially located between the cover and the first annular portion.

In some embodiments, the terminal body is provided with a first recess, and the terminal body is formed with a connecting portion at the bottom of the first recess. the step of installing the electrode assembly and the current collecting member into the housing and connecting the current collecting member to the terminal body comprises: installing the electrode assembly and the current collecting member into the housing, and pressing the current collecting member against the connecting portion; and acting, by an external welding device, on a surface of the connecting portion which faces away from the current collecting member so as to weld the connecting portion to the current collecting member.

In the foregoing solution, the provision of the first recess reduces the thickness of the connecting portion, which can reduce the welding power required for welding the connecting portion to the current collecting member, reduce heat generation, and reduce the risk of other members being burned. During welding from the outside, the housing can protect the electrode assembly, and prevent metal particles generated by welding from sputtering to the electrode assembly, thereby reducing the risk of a short circuit.

In some embodiments, the terminal body has a second outer surface and a second inner surface which are oppositely arranged in the first direction, and the first recess is recessed from a second outer surface to a first outer surface of the connecting portion in a direction toward the electrode assembly. The manufacturing method for a battery cell further comprises: a sealing plate is provided, the sealing plate is at least partially placed into the first recess, and the sealing plate is welded to a side wall of the first recess to close an opening of the first recess.

In the foregoing solution, the sealing plate can protect the connecting portion from the outside, reduce external impurities entering the first recess, reduce the risk of the connecting portion being damaged by the external impurities, and improve the sealing performance of the battery cell.

According to a fifth aspect, an embodiment of the present application provides a system for manufacturing a battery cell, comprising:

- a first provision means configured to provide a housing and a terminal body, wherein the housing comprises a barrel and a cover connected to the barrel, the barrel has an opening at an end facing away from the cover, and the cover is provided with an electrode lead-out hole in which the terminal body is installed;
- a second provision means configured to provide an electrode assembly, wherein the electrode assembly comprises a first tab, the first tab is arranged around a central axis of the electrode assembly, and the first tab comprises a first annular portion;
- a third provision means configured to provide a current collecting member and connect the current collecting member to the first annular portion;
- an assembly means configured to install the electrode assembly and the current collecting member into the housing and connect the current collecting member to the terminal body in such a way that the first tab is electrically connected to the terminal body; and
- a fourth provision means configured to provide a cover plate and connect the cover plate to the barrel to close the opening of the barrel;

The barrel is arranged around a periphery of the electrode assembly, the central axis extends in a first direction and passes through the electrode lead-out hole, the first annular portion is arranged opposite to the cover, a projection of the first annular portion in the first direction does not overlap with a projection of the electrode lead-out hole in the first direction, and the current collecting member is at least partially located between the cover and the first annular portion.

According to a sixth aspect, an embodiment of the present application provides another method for manufacturing a battery cell, comprising:

- providing a current collecting member and a terminal body, and connecting the current collecting member to the terminal body;
- providing an electrode assembly, wherein the electrode assembly comprises a first tab, the first tab is arranged around a central axis of the electrode assembly, and the first tab comprises a first annular portion;

connecting the current collecting member to the first annular portion in such a way that the first tab is electrically connected to the terminal body;

providing a housing, wherein the housing comprises a barrel and a cover connected to the barrel, the barrel has an opening at an end facing away from the cover, and the cover is provided with an electrode lead-out hole;

installing the electrode assembly and the current collecting member into the housing, and installing the terminal body into the electrode lead-out hole; and providing a cover plate and connecting the cover plate to the barrel to close the opening of the barrel;

The barrel is arranged around a periphery of the electrode assembly, the central axis extends in a first direction and passes through the electrode lead-out hole, the first annular portion is arranged opposite to the cover, a projection of the first annular portion in the first direction does not overlap with a projection of the electrode lead-out hole in the first direction, and the current collecting member is at least partially located between the cover and the first annular portion.

In some embodiments, the step of installing the electrode assembly and the current collecting member into the housing and installing the terminal body into the electrode lead-out hole comprises: installing the electrode assembly and the current collecting member into the housing and forcing an end portion of the terminal body which faces away from the electrode assembly to extend outside the cover through the electrode lead-out hole; and outwardly folding over an end portion of the terminal body which faces away from the electrode assembly to form an edge-folded structure, so as to fix the terminal body to the cover. In this embodiment, a process for assembling the terminal body to the cover can be simplified.

In some other embodiments, the step of installing the electrode assembly and the current collecting member into the housing and installing the terminal body into the electrode lead-out hole comprises: installing the electrode assembly and the current collecting member into the housing and forcing an end portion of the terminal body which faces away from the electrode assembly to extend outside the cover through the electrode lead-out hole; and squeezing the end portion of the terminal body which faces away from the electrode assembly to force the end portion to extend outwardly to form a limiting structure for fixing the terminal body to the cover. In this embodiment, a process for assembling the terminal body to the cover can be simplified.

According to a seventh aspect, an embodiment of the present application provides another system for manufacturing a battery cell, comprising:

a first provision means configured to provide a current collecting member and a terminal body and connect the current collecting member to the terminal body;

a second provision means configured to provide an electrode assembly, wherein the electrode assembly comprises a first tab, the first tab is arranged around a central axis of the electrode assembly, and the first tab comprises a first annular portion;

a first assembly means configured to connect the current collecting member to the first annular portion in such a way that the first tab is electrically connected to the terminal body;

a third provision means configured to provide a housing, wherein the housing comprises a barrel and a cover connected to the barrel, the barrel has an opening at an end facing away from the cover, and the cover is provided with an electrode lead-out hole;

a second assembly means configured to install the electrode assembly and the current collecting member into the housing and install the terminal body into the electrode lead-out hole; and a fourth provision means configured to provide a cover plate and connect the cover plate to the barrel to close the opening of the barrel;

The barrel is arranged around a periphery of the electrode assembly, the central axis extends in a first direction and passes through the electrode lead-out hole, the first annular portion is arranged opposite to the cover, a projection of the first annular portion in the first direction does not overlap with a projection of the electrode lead-out hole in the first direction, and the current collecting member is at least partially located between the cover and the first annular portion.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without creative efforts.

Figure 1:
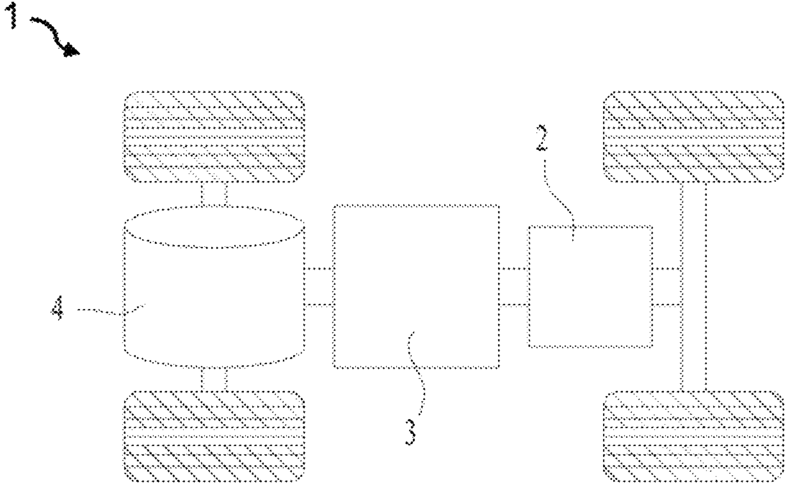
FIG. 1 is a schematic structural diagram of a vehicle provided in some embodiments of the present application.

In the drawings, the figures are not drawn to scale.

DETAILED DESCRIPTION OF EMBODIMENTS

In order to make the objectives, technical solutions and advantages of the embodiments of the present application clearer, the technical solutions in the embodiments of the present application will be described clearly below with reference to the drawings in the embodiments of the present application. Obviously, the embodiments described are some of, rather than all of, the embodiments of the present application. All the other embodiments obtained by those of ordinary skill in the art based on the embodiments of the present application without creative efforts shall fall within the scope of protection of the present application.

Unless otherwise defined, all technical and scientific terms used in the present application have the same meanings as those commonly understood by those skilled in the art to which the present application belongs. The terms used in the description of the present application are merely for the purpose of describing specific embodiments, but are not intended to limit the present application. The terms "comprise" and "have" and any variations thereof in the description and the claims of the present application as well as the description of the drawings described above are intended to cover non-exclusive inclusion. The terms "first", "second", etc. in the description and the claims of the present application as well as the foregoing drawings are used to distinguish between different objects, rather than describing a specific order or a primary-secondary relationship.

In the present application, "embodiment" mentioned means that the specific features, structures and characteristics described with reference to the embodiments may be included in at least one embodiment of the present application. The phrase at various locations in the description does not necessarily refer to the same embodiment, or an independent or alternative embodiment exclusive of another embodiment.

In the description of the present application, it should be noted that, the terms "install", "connected", "connect", or "attach" should be interpreted in a broad sense unless explicitly defined and limited otherwise. For example, the terms may be a fixed connection, a detachable connection, or an integral connection; or may be a direct connection, an indirect connection by means of an intermediate medium, or internal communication between two elements. For those of ordinary skills in the art, the specific meaning of the foregoing terms in the present application may be understood according to specific circumstances.

The term "and/or" in the present application is merely a description of the associated relationship of associated objects, representing that three relationships may exist, for example, A and/or B, may be expressed as: the three instances of A alone, A and B simultaneously, and B alone. In addition, the character "/" in the present application generally indicates that the associated objects before and after the character are in a relationship of "or".

In the embodiments of the present application, the same reference numerals denote the same components, and for the sake of brevity, the detailed description of the same components is omitted in different embodiments. It should be understood that the dimensions, such as thickness, length and width, of the various components in the embodiments of the present application illustrated in the drawings, as well as the dimensions, such as overall thickness, length and width, of an integrated apparatus are illustrative only and should not be construed to limit the present application in any way.

"A plurality of" appearing in the present application means two or more (including two).

In the present application, a battery cell may comprise a lithium-ion secondary battery cell, a lithium-ion primary battery cell, a lithium-sulfur battery cell, a sodium-lithium-ion battery cell, a sodium-ion battery cell, a magnesium-ion battery cell, or the like, which is not limited in the embodiments of the present application.

A battery mentioned in the embodiments of the present application refers to a single physical module comprising one or more battery cells to provide a higher voltage and capacity. For example, the battery mentioned in the present application may comprise a battery module, a battery pack, or the like. The battery generally comprises a case for packaging one or more battery cells. The case can prevent liquid or other foreign matters from affecting the charging or discharging of the battery cell.

The battery cell comprises an electrode assembly and an electrolyte, the electrode assembly comprising a positive electrode plate, a negative electrode plate, and a separator. The battery cell operates mainly by relying on movement of metal ions between the positive electrode plate and the negative electrode plate. The positive electrode plate comprises a positive current collector and a positive active material layer, wherein a surface of the positive current collector is coated with the positive active material layer. The positive current collector comprises a positive current collecting portion and a positive tab, wherein the positive current collecting portion is coated with the positive active material layer, and the positive tab is not coated with the positive active material layer. Taking a lithium-ion battery as an example, the positive current collector may be made of aluminum, the positive active material layer comprises a positive active material which may be lithium cobalt oxides, lithium iron phosphate, ternary lithium, lithium manganate, or the like. The negative electrode plate comprises a negative current collector and a negative active material layer, wherein a surface of the negative current collector is coated with the negative active material layer. The negative current collector comprises a negative current collecting portion and a negative tab, wherein the negative current collecting portion is coated with the negative active material layer, and the negative tab is not coated with the negative active material layer. The negative current collector may be made of copper, the negative active material layer comprises a negative active material which may be carbon, silicon, or the like. The separator may be made of polypropylene (PP), polyethylene (PE), or the like.

The battery cell further comprises a housing for accommodating an electrode assembly, the housing is provided with an electrode lead-out hole for installing an electrode terminal, and the electrode terminal is configured to be electrically connected to the electrode assembly for implementing the charging and discharging of the electrode assembly.

The electrode plate of the electrode assembly comprises an electricity generating portion and a tab connected to the electricity generating portion. Taking the positive electrode plate as an example, the electricity generating portion comprises a positive current collecting portion and an active material layer coated on the positive current collecting portion. Electrode assemblies generally input and output currents through the tab. In a wound electrode assembly, both the tab and the electricity generating portion are of a multi-turn structure. With the increase in the number of turns from inside to outside, a perimeter of each turn of the electricity generating portion and the tab gradually increases, and correspondingly, internal resistance of each turn also gradually increases.

The housing comprises a cover opposite to the tab, and the electrode lead-out hole is provided in the cover. The electrode lead-out hole is usually provided in the middle of the cover, and correspondingly, the electrode terminal is also installed on the middle of the cover.

The inventors have noticed that due to the limitation by the position of the electrode lead-out hole, the electrode terminal can only be connected to an inner turn region of the tab for implementing an electrical connection between the electrode terminal and the tab, but cannot be connected to an outer turn region of the tab, which resulting in a long conductive path between the outer turn region of the electricity generating portion and the electrode terminal and an excessively large internal resistance, thereby affecting the overcurrent capability and charging efficiency of the battery cell.

In view of this, an embodiment of the present application provides a technical solution in which a current collecting member is provided to connect the electrode terminal to the tab, and the current collecting member is connected to a portion of the tab which is close to the outside relative to the electrode lead-out hole, so as to shorten the conductive path between the tab and the electrode terminal, to reduce the internal resistance, and to improve the overcurrent capability.

The technical solution described in the embodiment of the present application is applicable to a battery and a power consuming device using a battery.

The power consuming device may be a vehicle, a mobile phone, a portable device, a notebook computer, a ship, a spacecraft, an electric toy, an electric tool, etc. The vehicle may be a fuel vehicle, a gas vehicle or a new-energy vehicle. The new-energy vehicle may be a battery electric vehicle, a hybrid vehicle, an extended-range vehicle, or the like. The spacecraft includes an airplane, a rocket, an aerospace plane, a spaceship, etc. The electric toy includes a stationary or mobile electric toy, such as a game machine, an electric toy car, an electric toy ship, and an electric toy airplane. The electric tool includes a metal cutting electric tool, a grinding electric tool, an assembling electric tool, and a railway electric tool, such as an electric drill, an electric grinder, an electric wrench, an electric screwdriver, an electric hammer, an electric impact drill, a concrete vibrator, and an electric planer. The foregoing power consuming devices are not specifically limited in the embodiments of the present application.

For ease of description, an example in which a power consuming device refers to a vehicle is used for description in the following embodiments.

FIG. 1 is a schematic structural diagram of a vehicle provided in some embodiments of the present application. As shown in FIG. 1, a battery 2 is provided inside the vehicle 1, and the battery 2 may be arranged at the bottom, the head or the tail of the vehicle 1. The battery 2 may be configured for power supply for the vehicle 1. For example, the battery 2 may serve as an operating power source for the vehicle 1.

The vehicle 1 may further comprise a controller 3 and a motor 4, and the controller 3 is configured to control the battery 2 to supply power to the motor 4, for example, to satisfy operating power demands during starting, navigation and traveling of the vehicle 1.

In some embodiments of the present application, the battery 2 can not only serve as an operating power source for the vehicle 1, but also serve as a driving power source for the vehicle 1, in place of or partially in place of fuel or natural gas, to provide driving power for the vehicle 1.

Figure 2:
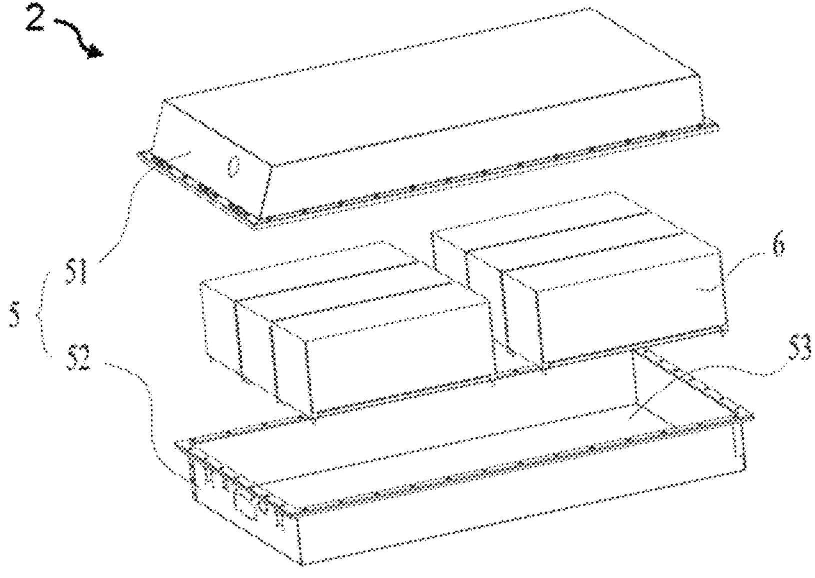
FIG. 2 is a schematic exploded view of a battery provided in some embodiments of the present application.

FIG. 2 is a schematic exploded view of a battery provided in some embodiments of the present application. As shown in FIG. 2, the battery 2 comprises a case 5 and battery cells (not shown in FIG. 2) which are accommodated in the case 5.

The case 5 is configured to accommodate the battery cells, and the case 5 may have various structures. In some embodiments, the case 5 may comprise a first case portion 51 and a second case portion 52, the first case portion 51 and the second case portion 52 cover each other, and the first case portion 51 and the second case portion 52 jointly define an accommodating space 53 for accommodating the battery cells. The second case portion 52 may be a hollow structure with an open end, the first case portion 51 has a plate-like structure, and the first case portion 51 covers an open side of the second case portion 52 to form the case 5 with the accommodating space 53. The first case portion 51 and the second case portion 52 each may also be a hollow structure with an open side, and the open side of the first case portion 51 covers the open side of the second case portion 52 to form the case 5 with the accommodating space 53. Of course, the first case portion 51 and the second case portion 52 may have various shapes such as a cylinder and a cuboid.

To improve sealing performance after the first case portion 51 and the second case portion 52 are connected to each other, a seal, such as a sealant and a seal ring, may be provided between the first case portion 51 and the second case portion 52.

Assuming that the first case portion 51 covers the top of the second case portion 52, the first case portion 51 may also be referred to as an upper case cover, and the second case portion 52 may also be referred to as a lower case.

In the battery 2, one or more battery cells may be provided. If a plurality of battery cells are provided, the plurality of battery cells may be in series connection or parallel connection or series-parallel connection. The series-parallel connection means that some of the plurality of battery cells are in series connection and some are in parallel connection. The plurality of battery cells may be directly in series connection or parallel connection or series-parallel connection, and then a whole composed of the plurality of battery cells is accommodated in the case 5. Of course, a plurality of battery cells may also be first in series connection or parallel connection or series-parallel connection to form a battery module 6, and a plurality of battery modules 6 are in series connection or parallel connection or series-parallel connection to form a whole and are accommodated in the case 5.

Figure 3:
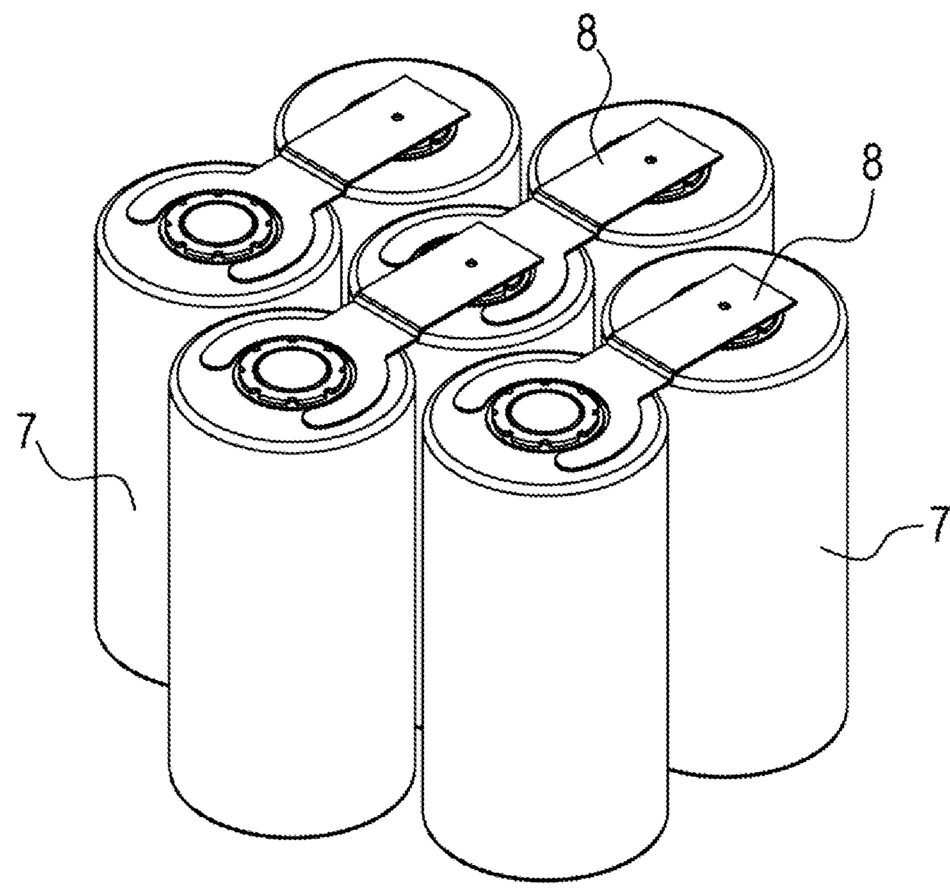
FIG. 3 is a schematic structural diagram of a battery module shown in FIG. 2.

FIG. 3 is a schematic structural diagram of the battery module shown in FIG. 2.

In some embodiments, as shown in FIG. 3, a plurality of battery cells 7 are provided, and the plurality of battery cells 7 are connected in series or in parallel or in series-parallel to form a battery module 6. A plurality of battery modules 6 are connected in series or in parallel or in series-parallel to form a whole and are accommodated in the case.

The plurality of battery cells 7 in the battery module 6 may be electrically connected to each other by means of a busbar component 8 to implement series connection or parallel connection or series-parallel connection between the plurality of battery cells 7 in the battery module 6. There may be one or more busbar components, and each busbar component 8 is configured to electrically connect at least two battery cells.

Figure 4:
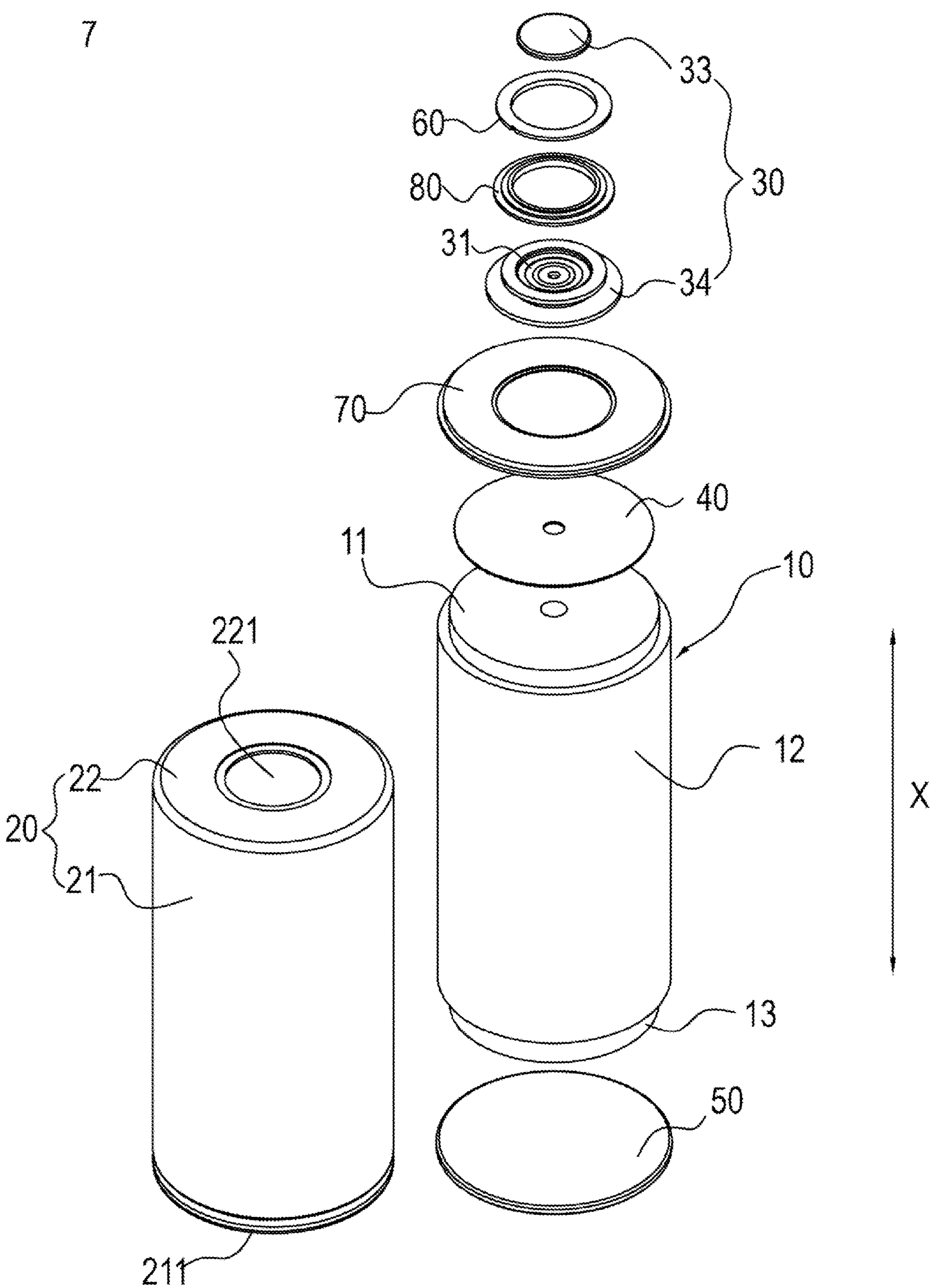
FIG. 4 is a schematic exploded view of a battery cell provided in some embodiments of the present application.
Figure 5:
FIG. 5 is a schematic cross-sectional view of a battery cell provided in some embodiments of the present application.
Figure 5:
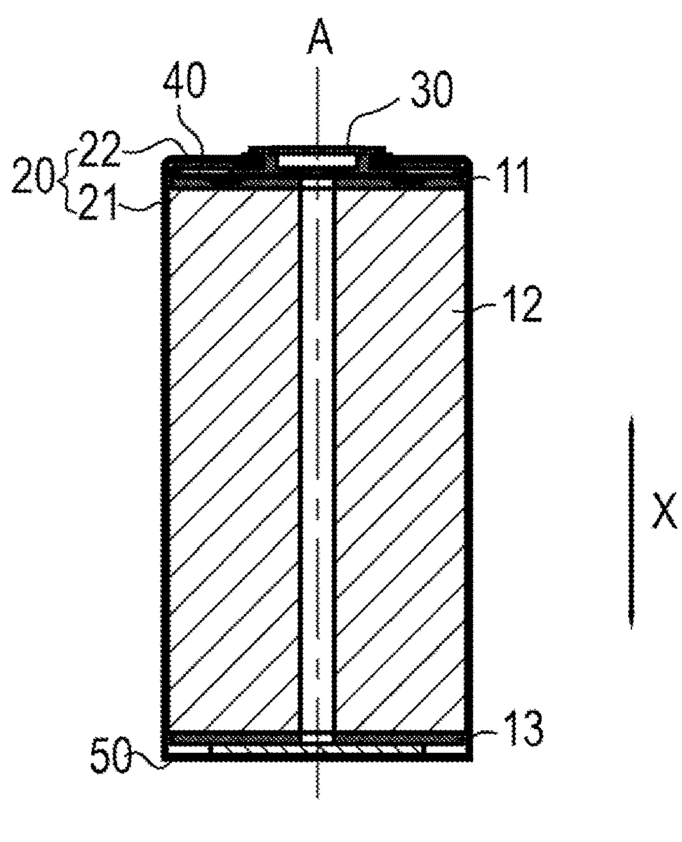

FIG. 4 is a schematic exploded view of a battery cell provided in some embodiments of the present application; FIG. 5 is a schematic cross-sectional view of a battery cell provided in some embodiments of the present application; and FIG. 6 is a partial enlarged schematic diagram of the battery cell shown in FIG. 5.

Figure 6:
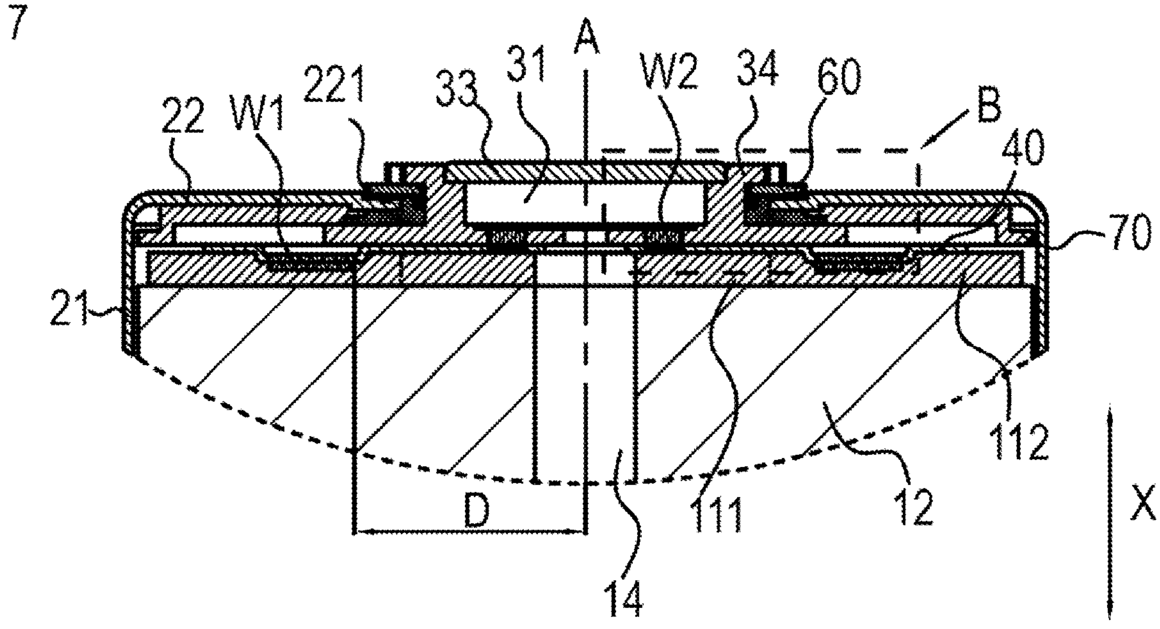
FIG. 6 is a partial enlarged schematic diagram of the battery cell shown in FIG. 5.

As shown in FIGS. 4 to 6, an embodiment of the present application provides a battery cell 7, comprising: an electrode assembly 10 comprising a first tab 11, the first tab 11 being arranged around a central axis A of the electrode assembly 10; a housing 20 configured to accommodate the electrode assembly 10, wherein the housing 20 comprises a barrel 21 and a cover 22 connected to the barrel 21, the barrel 21 is arranged around a periphery of the electrode assembly 10, the cover 22 is provided with an electrode lead-out hole 221, a central axis A extends in a first direction X and passes through the electrode lead-out hole 221, the first tab 11 comprises a first annular portion 112, the first annular portion 112 is arranged opposite to the cover 22, and a projection of the first annular portion 112 in the first direction X does not overlap with a projection of the electrode lead-out hole 221 in the first direction X; an electrode terminal 30 installed in the electrode lead-out hole 221; and a current collecting member 40 which is at least partially located between the cover 22 and the first annular portion 112, wherein the current collecting member 40 is configured to connect the first annular portion 112 to the electrode terminal 30 in such a way that the first tab 11 is electrically connected to the electrode terminal 30.

The electrode assembly 10 comprises a first electrode plate, a second electrode plate, and a separator, wherein the separator is configured to separate the first electrode plate from the second electrode plate. The first electrode plate and the second electrode plate have opposite polarities, in other words, one of the first electrode plate and the second electrode plate is a positive electrode plate, and the other of the first electrode plate and the second electrode plate is a negative electrode plate.

The first electrode plate, the second electrode plate and the separator each is of a strip-shaped structure, and the first electrode plate, the second electrode plate and the separator are wound around the central axis A as one piece to form a wound structure. The wound structure may be a cylindrical structure, a flat structure or a structure of another shape.

As seen from the appearance of the electrode assembly 10, the electrode assembly 10 comprises a main body portion 12, a first tab 11, and a second tab 13, and the first tab 11 and the second tab 13 protruding from the main body portion 12. The first tab 11 is a part of the first electrode plate which is not coated with an active material layer, and the second tab 13 is a part of the second electrode plate which is not coated with an active material layer.

The first tab 11 and the second tab 13 may extend from the same side of the main body portion 12, or may extend from two opposite sides respectively. For example, the first tab 11 and the second tab 13 are arranged on two sides of the main body portion 12 in the first direction X respectively, in other words, the first tab 11 and the second tab 13 are arranged at two ends of the electrode assembly 10 in the first direction X respectively. The first tab 11 is located at one end of the electrode assembly 10 facing the cover 22, and the second tab 13 is located at the other end of the electrode assembly 10 which faces away from the cover 22.

Optionally, the first tab 11 is wound around the central axis A of the electrode assembly 10 by a plurality of turns, in other words, the first tab 11 comprises a plurality of turns of tab layers. After the winding is completed, the first tab 11 is generally cylindrical, with a slit reserved between two adjacent turns of tab layers. In this embodiment of the present application, the first tab 11 can be treated to reduce the slit between the tab layers for facilitating the connection of the first tab 11 to another conductive structure. For example, in this embodiment of the present application, the first tab 11 can be flattened, such that end portion regions of the first tab 11 away from the main body portion 12 are gathered together. The flattening enables a compact end face to be formed at an end of the first tab 11 away from the main body portion 12, which reduces the slit between the tab layers and facilitates the connection of the first tab 11 to the current collecting member 40. Alternatively, in this embodiment of the present application, a conductive material may also fill between two adjacent turns of tab layers, so as to reduce the slit between the tab layers.

Optionally, the second tab 13 is wound around the central axis A of the electrode assembly 10 by a plurality of turns, and the second tab 13 comprises a plurality of turns of tab layers. For example, the second tab 13 is also flattened to reduce a slit between tab layers of the second tab 13.

The housing 20 is of a hollow structure, and has a space for accommodating the electrode assembly 10 formed therein. The shape of the housing 20 may be determined depending on the specific shape of the electrode assembly 10. For example, if the electrode assembly 10 is of a cylindrical structure, a cylindrical housing may be selected; and if the electrode assembly 10 is of a cuboid structure, a cuboid housing may be used. Optionally, the electrode assembly 10 and the housing 20 are both cylinders; correspondingly, the barrel 21 is a cylinder, and the cover 22 has a circular plate-like structure.

The cover 22 and the barrel 21 may be of an integrally formed structure, that is, the housing 20 is an integrally formed member. Of course, the cover 22 and the barrel 21 may also be two members provided separately and then are connected together by welding, riveting, bonding, etc.

The housing 20 is of a hollow structure with an open side. Specifically, the barrel 21 has an opening 211 at an end facing away from the cover 22. The battery cell 7 further comprises a cover plate 50, and the cover plate 50 covers the opening of the barrel 21 to close the opening 211 of the barrel 21. The cover plate 50 may have various structures, for example, the cover plate 50 has a plate-like structure.

The electrode lead-out hole 221 runs through the cover 22, such that electric energy in the electrode assembly 10 can be led out of the housing 20. For example, the electrode lead-out hole 221 runs through the cover 22 in the first direction X.

The central axis A is a virtual straight line parallel to the first direction X, and passes through the electrode lead-out hole 221. The central axis A of the electrode assembly 10 and the axis of the electrode lead-out hole 221 may or may not coincide.

The electrode terminal 30 is configured to match the electrode lead-out hole 221 to cover the electrode lead-out hole 221. The electrode terminal 30 may extend into the electrode lead-out hole 221 or may not extend into the electrode lead-out hole 221. The electrode terminal 30 is fixed to the cover 22. The electrode terminal 30 may be entirely fixed to the outside of the cover 22, or may extend to the inside of the housing 20 through the electrode lead-out hole 221.

The electrode terminal 30 is configured to be connected to the busbar component to implement the electrical connection between the battery cells 7.

The electrode terminal 30 may be arranged on the cover 22 in an insulating manner, or may be electrically connected to the cover 22. This is not limited in the embodiments of the present application, as long as the conductivity between the first tab 11 and the second tab 13 is prevented.

The housing 20 may be positively charged, negatively charged or uncharged.

The first tab 11 may be a positive tab or a negative tab.

The current collecting member 40 may be connected to the first annular portion 112 of the first tab 11 by welding, abutting, bonding, etc., and connected to the electrode terminal 30 by welding, abutting, bonding, riveting, etc., so as to implement the electrical connection between the first tab 11 and the electrode terminal 30.

The first annular portion 112 is of an annular structure arranged around the central axis A, and is located outside the electrode lead-out hole 221 in a second direction which is a radial direction of the first tab 11.

In this embodiment, the cover 22 refers to a solid part, and is arranged opposite to the first annular portion 112 in the first direction X. The cover 22 covers the first annular portion 112 in the first direction X.

The first tab 11 may be entirely located outside the electrode lead-out hole 221 in the second direction, that is, the first tab 11 comprises only the first annular portion 112. Of course, a portion of the first tab 11 may also be arranged opposite to the electrode lead-out hole 221 in the first direction X, that is, the projection of the first tab 11 in the first direction X partially overlaps with the projection of the electrode lead-out hole 221 in the first direction X.

The current collecting member 40 at least partially overlaps with the first annular portion 112 in the first direction X, in order to facilitate connection of the current collecting member 40 to the first annular portion 112.

The first annular portion 112 is located outside the electrode lead-out hole 221 in the second direction, and a radius of each turn of tab layer in the first annular portion 112 is greater than that of the electrode lead-out hole 221.

In the battery cell 7 according to this embodiment of the present application, the current collecting member 40 is arranged to connect the electrode terminal 30 to the first annular portion 112 of the first tab 11, such that currents in the electrode assembly 10 can flow to the electrode terminal 30 through the first annular portion 112 and the current collecting member 40, thereby shortening the conductive path, reducing the internal resistance, and improving the overcurrent capability and charging efficiency of the battery cell 7.

An outer turn region of an electricity generating portion of the first electrode plate corresponds to the first annular portion 112, and currents in an outer turn portion can flow to the electrode terminal 30 through the first annular portion 112, thereby shortening the conductive path; and a perimeter of an inner turn region of the electricity generating portion of the first electrode plate is relatively small, such that a conductive path between the inner turn region and the first annular portion 112 is also relatively small. Therefore, in this embodiment, the conductive path can be shortened, and the internal resistance can be reduced.

In some embodiments, the central axis A coincides with an axis of the electrode lead-out hole 221.

In this embodiment, it is not required that the central axis A perfectly coincide with the axis of the electrode lead-out hole 221, and there may be a deviation allowed by a process between the two axes.

In this embodiment, the electrode lead-out hole 221 is substantially provided in the middle of the cover 22, and correspondingly, the electrode terminal 30 is also installed on the middle of the cover 22. When a plurality of battery cells 7 are assembled into sets, a requirement for positioning precision of the electrode terminal 30 can be reduced, which simplifies an assembly process.

For example, the axis of the electrode lead-out hole 221 coincides with an axis of the cover 22, and the cover 22 is of an annular structure arranged around the axis of the electrode lead-out hole 221.

For example, the axis of the electrode terminal 30 coincides with the axis of the electrode lead-out hole 221.

In some embodiments, the cover 22 and the barrel 21 are of an integrally formed structure. This allows procedures for connecting the cover 22 to the barrel 21 to be omitted. The housing 20 may be formed by a drawing process.

In some embodiments, the electrode assembly 10 further comprises a second tab 13, and the second tab 13 is arranged around the central axis A of the electrode assembly 10. The first tab 11 and the second tab 13 are arranged at two ends of the electrode assembly 10 in the first direction X respectively. The barrel 21 is configured to connect the second tab 13 to the cover 22 in such a way that the second tab 13 is electrically connected to the cover 22.

The barrel 21 may be directly electrically connected to the second tab 13, or may be electrically connected to the second tab 13 by means of another member. For example, the second tab 13 is electrically connected to the barrel 21 by means of the cover plate 50.

The cover 22 and the electrode terminal 30 have different polarities. In this case, one of the cover 22 and the electrode terminal 30 may act as a positive output electrode of the battery cell 7, and the other may act as a negative output electrode of the battery cell 7. In this embodiment, the positive output electrode and the negative output electrode are arranged on the same side of the battery cell 7, which can simplify a process for connecting the plurality of battery cells 7.

The electrode lead-out hole 221 in this embodiment of the present application is formed after the housing 20 is formed by drawing.

The inventors tried to roll an open end of the barrel to fold over the open end of the cylinder inwards to form an edge-folded structure, and the edge-folded structure presses the cover plate to implement the fixing of the cover plate. The inventors installed the electrode terminal on the cover plate, and used the edge-bent structure and the electrode terminal as two output electrodes of the battery cell. However, the larger the size of the edge-bent structure, the higher the risk of curling and creases of the edge-bent structure after forming. If the edge-bent structure is curled and creased, a surface of the edge-bent structure is uneven. When the edge-bent structure is welded to an external busbar component, the problem of poor welding will occur. Therefore, the size of the edge-bent structure is relatively limited, resulting in an insufficient overcurrent capability of the battery cell.

In this embodiment, the electrode lead-out hole 221 for installing the electrode terminal 30 is formed in the cover 22 by using a trepanning process, so as to arrange the positive output electrode and the negative output electrode at an end of the battery cell 7 which faces away from the opening of the barrel 21. The cover 22 is formed during forming the housing 20, and flatness can be ensured even after the electrode lead-out hole 221 is provided, such that a connection strength between the cover 22 and the busbar component is ensured. In addition, the flatness of the cover 22 is not restricted by its own size, such that the cover 22 may have a relatively large size, so as to improve the overcurrent capability of the battery cell 7.

In some embodiments, the second tab 13 is a negative tab, and a bulk material of the housing 20 is steel.

The housing 20 is electrically connected to the negative tab, i.e., the housing 20 is in a low potential state. The housing 20 of steel is not prone to corrosion by the electrolyte in the low potential state.

In some embodiments, the first annular portion 112 is welded to the current collecting member 40 to form a first welded portion W1.

When the battery cell 7 is assembled, the first annular portion 112 of the first tab 11 of the electrode assembly 10 may be first welded to the current collecting member 40, and then the electrode assembly 10 and the current collecting member 40 are placed into the housing 20. Specifically, when the first annular portion 112 is welded to the current collecting member 40, the current collecting member 40 may be pressed against the flattened end face of the first tab 11 first, and then an external welding device emits laser light on a surface of the current collecting member 40 which faces away from the first tab 11, and the laser light welds the current collecting member 40 to the first annular portion 112 of the first tab 11.

The first welded portion W1 may be linear, C-shaped, annular, spiral, V-shaped or in another shape, which is not limited in this embodiment.

One or more first welded portions W1 may be provided.

The first welded portion W1 can reduce contact resistance between the current collecting member 40 and the first annular portion 112 and improve the overcurrent capability.

In some embodiments, a cross section of the first tab 11 perpendicular to the first direction X is annular. The first tab 11 has an outer radius R, a minimum distance D between the first welded portion W1 and the central axis A in a second direction is provided, and R and D meet: $0.2 \leq D/R \leq 0.8$, wherein the second direction is a radial direction of the first tab 11.

Upon being flattened, the first tab 11 is generally cylindrical. The cross section of the first tab 11 perpendicular to the first direction X is not required to be absolutely annular, and a certain deviation is allowed.

The first welded portion W1 is configured to transmit currents between the current collecting member 40 and the first tab 11, and a position of the first welded portion has a direct impact on a conductive path of each portion of the first tab 11. If D/R is less than 0.2, a distance between the first welded portion W1 and an outermost tab layer is excessively large, resulting in an excessively large difference between a current path between the outermost tab layer and the electrode terminal 30 and a current path between an innermost tab layer and the electrode terminal 30, which causes a nonuniform current density of the first electrode plate of the electrode assembly and increases the internal resistance. If D/R is greater than 0.8, a distance between the first welded portion W1 and the innermost tab layer is excessively large, resulting in an excessively large difference between the current path between the outermost tab layer and the electrode terminal 30 and the current path between the innermost tab layer and the electrode terminal 30, which causes a nonuniform current density of the first electrode plate and increases the internal resistance.

In this embodiment of the present application, values of D and R are set to meet $0.2 \leq D/R \leq 0.8$, which can reduce a difference of current paths between portions of the first tab 11 at different positions and the electrode terminal 30, improve the uniformity of the current density of a first electrode plate of the electrode assembly 10, reduce the internal resistance, and improve the overcurrent capability.

Optionally, D/R is greater than or equal to 0.3 and less than or equal to 0.7. As an example, the value of D/R is 0.3, 0.4, 0.5, 0.6 or 0.7.

In some embodiments, the total number of turns of the tab layers of the first tab 11 is N1, the total number of turns of the tab layers connected to the first welded portion W1 is N2, and the two meet: $0.3 \leq N2/N1 \leq 0.7$.

The first welded portion W1 connects the N2 turns of tab layers together, such that the currents between the N2 turns of tab layers can directly flow to the current collecting member 40 through the first welded portion W1 without passing through other tab layers. If $N2/N1 \geq 0.3$, the overcurrent capability can be effectively improved, and the difference of the current paths between different portions of the first tab 11 and the electrode terminal 30 can be reduced. If $N2/N1 \geq 0.7$, in the radial direction of the electrode assembly 10, the size of the first welded portion W1 on the current collecting member 40 is excessively large, which will affect the welding of the current collecting member 40 to the electrode terminal 30.

Optionally, the value of N2/N1 may be 0.3, 0.4, 0.5, 0.6 or 0.7.

Figure 7:
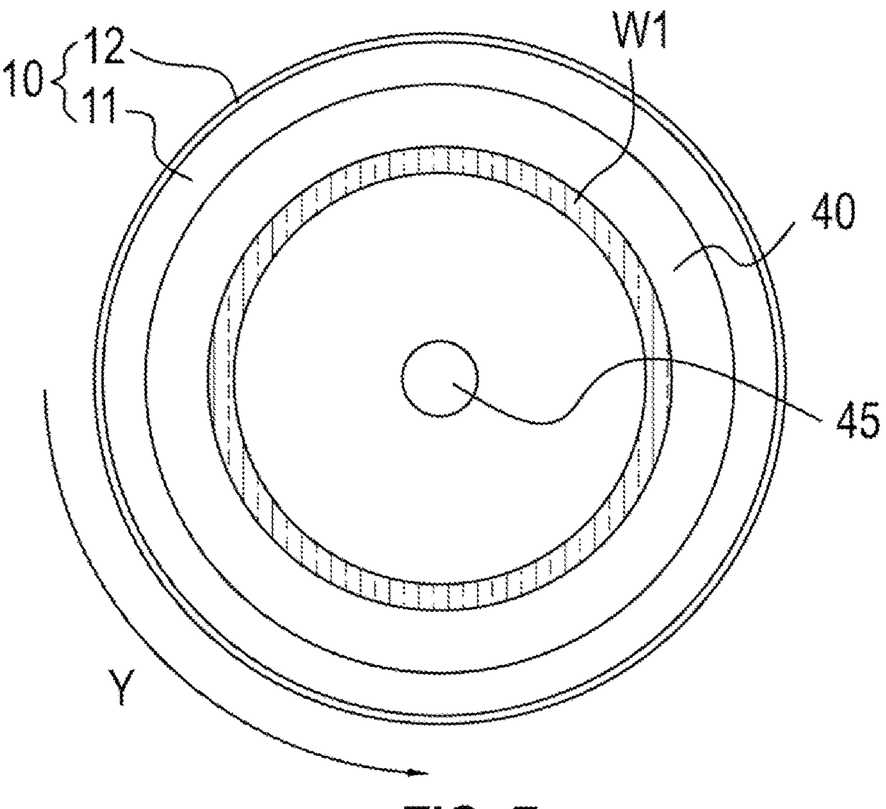
FIG. 7 is a schematic structural diagram of an electrode assembly and a current collecting member of a battery cell in some embodiments of the present application after welding.
Figure 8:
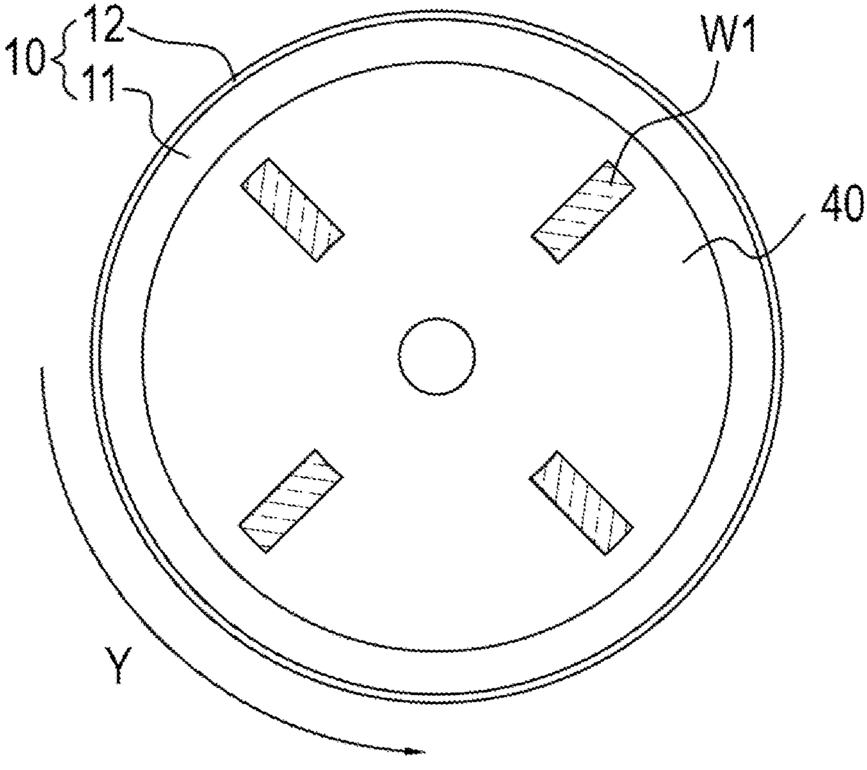
FIG. 8 is a schematic structural diagram of an electrode assembly and a current collecting member of a battery cell in some other embodiments of the present application after welding.

FIG. 7 is a schematic structural diagram of an electrode assembly and a current collecting member of a battery cell in some embodiments of the present application after welding; FIG. 8 is a schematic structural diagram of an electrode assembly and a current collecting member of a battery cell in some other embodiments of the present application after welding.

As shown in FIG. 7, in some embodiments, the first welded portion W1 is annular and is arranged around a central axis.

The annular first welded portion W1 has a relatively large overcurrent area which can improve the uniformity of the current density of the first electrode plate, reduce the internal resistance, and improve the overcurrent capability.

In some embodiments, in the radial direction of the electrode assembly 10, a ratio of the size of the first welded portion W1 (i.e., the width of a ring of the annular first welded portion W1) to the outer radius of the first tab 11 is between 0.3 and 0.7.

As shown in FIG. 8, in some other embodiments, a plurality of first welded portions W1 are provided, and the plurality of first welded portions W1 are spaced in a circumferential direction Y of the first annular portion.

The first welded portion W1 may have a linear structure extending in the radial direction of the electrode assembly 10, or may have a V-shaped structure, or of course, may have another structure.

The plurality of first welded portions W1 can increase the overcurrent area, improve the uniformity of the current density of the first electrode plate, reduce the internal resistance, and improve the overcurrent capability.

Figure 9:
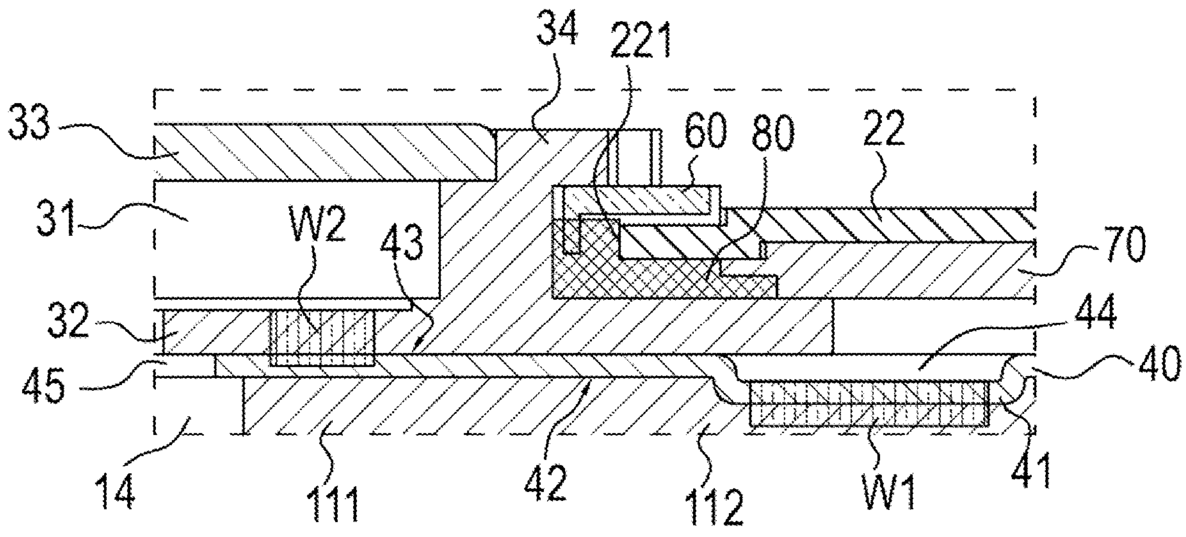
FIG. 9 is an enlarged schematic diagram of the battery cell shown in FIG. 6 at box B.
Figure 10:
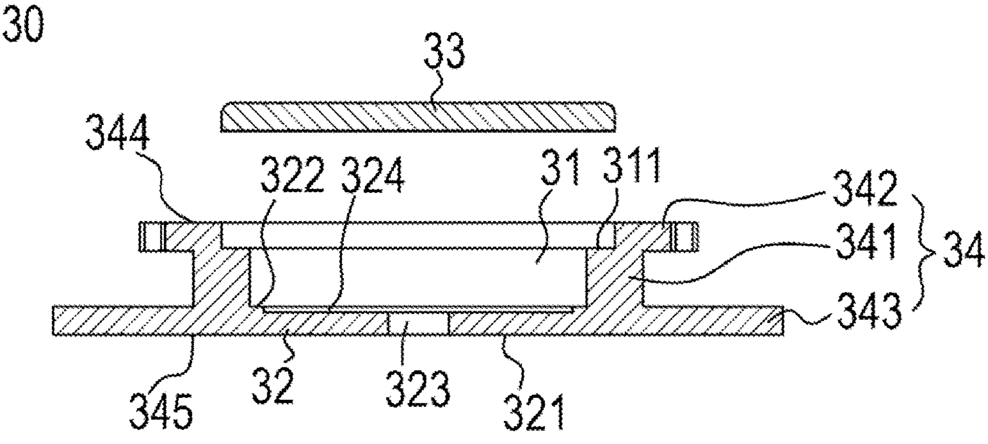
FIG. 10 is a schematic exploded view of an electrode terminal of a battery cell provided in some embodiments of the present application.

FIG. 9 is an enlarged schematic diagram of the battery cell shown in FIG. 6 at box B; and FIG. 10 is a schematic exploded view of an electrode terminal of a battery cell provided in some embodiments of the present application.

Referring to FIGS. 6, 9 and 10, in some embodiments, the current collecting member 40 is provided with a bump 41 on a side facing the first tab 11, and the bump 41 is welded to the first annular portion 112 to form the first welded portion W1.

The current collecting member 40 has a third inner surface 42 and a third outer surface 43 which are oppositely arranged in the first direction X, the third inner surface 42 facing the first tab 11. The bump 41 protrudes toward the first annular portion 112 of the first tab 11 relative to the third inner surface 42. The third inner surface 42 and the third outer surface 43 may be planar. In some examples, portions of the current collecting member 40 other than the bump 41 have a generally flat plate structure.

When the current collecting member 40 is assembled with the electrode assembly 10, the bump 41 of the current collecting member 40 is first pressed against the first annular portion 112 first, and then the bump 41 is welded to the first annular portion 112. The bump 41 can be better attached to the first annular portion 112, reducing the risk of poor welding.

In some embodiments, the bump 41 may press the first annular portion 112 and be embedded in the first annular portion 112, and the third inner surface 42 is pressed against an end face of the first annular portion 112. In this way, part of the currents can also be transmitted through a mating portion between the third inner surface 42 and the end face of the first annular portion 112, thereby improving the overcurrent capability.

In some embodiments, the current collecting member 40 forms a third recess 44 at a position corresponding to the bump 41, and the third recess 44 is recessed relative to the third outer surface 43 in a direction toward the first annular portion 112. A transition is formed between a bottom surface of the third recess 44 and a top surface of the bump 41, and the transition is welded to the first annular portion 112 to form the first welded portion W1.

The provision of the third recess 44 can reduce the thickness of the transition, so as to reduce the welding power required for welding the transition to the first annular portion 112, to reduce heat generation, and to reduce the risk of the electrode assembly 10 being burned.

The first welded portion W1 is formed by welding, and has an uneven surface. In this embodiment, the provision of the third recess 44 allows the surface of the first welded portion W1 to be recessed relative to the third outer surface 43, so as to enable the first welded portion W1 to avoid other members (e.g., the electrode terminal 30).

In some embodiments, a fixing piece (not shown) may be provided in the third recess 44, and the fixing piece is configured to cover the first welded portion W1, so as to fix remaining metal particles on the first welded portion W1 and to reduce the risk of the metal particles falling into the electrode assembly 10 and causing a short circuit. The fixing piece may be an insulating patch or an insulating adhesive layer or be another structure.

The first tab 11 further comprises a second annular portion 111, the second annular portion 111 is arranged opposite to the electrode lead-out hole 221 in the first direction X, and the first annular portion 112 surrounds the outside of the second annular portion 111. At least a part of the second annular portion 111 abuts against the current collecting member 40.

The second annular portion 111 being arranged opposite to the electrode lead-out hole 221 in the first direction X means that a projection of the second annular portion 111 in the first direction X is located within the projection of the electrode lead-out hole 221 in the first direction X, and the contour of the projection of the second annular portion 111 in the first direction X coincides with the contour of the projection of the electrode lead-out hole 221 in the first direction X. For example, the second annular portion 111 is arranged around the central axis A.

The first annular portion 112 is connected to the second annular portion 111, and the first annular portion 112 is an annular structure surrounding the outside of the second annular portion 111. The contour of the projection of the electrode lead-out hole 221 on the first tab 11 in the first direction X may be considered as coinciding with the contour of a boundary between the second annular portion 111 and the first annular portion 112.

At least a part of the second annular portion 111 abuts against the third inner surface 42 of the current collecting member 40. Part of the currents may be transmitted to the current collecting member 40 through an abutment between the second annular portion 111 and the current collecting member 40.

In this embodiment, the provision of the second annular portion 111 can improve the overcurrent capability. The second annular portion 111 can also support the first annular portion 112 in the radial direction to reduce the risk of crushing deformation of the first annular portion 112 and improve the stability of welding of the first annular portion 112 and the current collecting member 40 when the first annular portion 112 is welded to the current collecting member 40.

In some embodiments, the electrode terminal 30 comprises a terminal body 34, and the terminal body 34 has a first recess 31. The terminal body 34 is formed with a connecting portion 32 at the bottom of the first recess 31, and the connecting portion 32 is welded to the current collecting member 40 to form a second welded portion W2.

The connecting portion 32 has a first inner surface 321 and a first outer surface 322 which are oppositely arranged, the first inner surface 321 facing the current collecting member 40. Optionally, both the first inner surface 321 and the first outer surface 322 are planar.

The first recess 31 may be recessed from a side of the electrode terminal 30 which faces away from the electrode assembly 10 in a direction toward the electrode assembly 10, or may be recessed from a side of the electrode terminal 30 facing the electrode assembly 10 in a direction away from the electrode assembly 10. In other words, the terminal body 34 has a second outer surface 344 and a second inner surface 345 which are arranged in the first direction, and the first recess 31 may be recessed in the second outer surface 344, or may be recessed in the second inner surface 345.

A projection of the connecting portion 32 in the first direction X is located within the projection of the electrode lead-out hole 221 in the first direction X. In the first direction X, the current collecting member 40 is located between the connecting portion 32 and the first tab 11. A portion of the current collecting member 40 overlaps with the connecting portion 32 in the first direction X to implement welding of the connecting portion 32 to the current collecting member 40.

When the electrode assembly 10 and the current collecting member 40 are installed into the housing 20 through the opening of the barrel 21, and after the current collecting member 40 is pressed against the connecting portion 32, the external welding device can weld, from the side of the connecting portion 32 which faces away from the current collecting member 40, the connecting portion 32 to the current collecting member 40 to form the second welded portion W2.

In this embodiment, the provision of the first recess 31 reduces the thickness of the connecting portion 32, which can reduce the welding power required for welding the connecting portion 32 to the current collecting member 40, reduce heat generation, and reduce the risk of other members (e.g., a first insulating member 60 mentioned below) being burned.

In some embodiments, the connecting portion 32 has a thickness of 0.5-10 mm.

In some embodiments, the second welded portion W2 extends from the first outer surface 322 to the current collecting member 40 in a thickness direction of the connecting portion 32, and the second welded portion W2 is separated from a surface of the current collecting member 40 which faces away from the connecting portion 32 by a predetermined distance, so as to prevent the current collecting member 40 from being melted through.

In some embodiments, the connecting portion 32 is provided with a stress relief structure which is configured to release stresses when the connecting portion 32 is welded to the current collecting member 40.

During welding, the connecting portion 32 is subject to welding stresses. In the present application, the stresses are released by providing the stress relief structure, thereby reducing the risk of deformation and cracking of the connecting portion 32 during welding, and ensuring the connection strength between the connecting portion 32 and the current collecting member 40.

For example, the stress relief structure may be a hole or a slot or another structure.

In some embodiments, the connecting portion 32 is provided with a first through hole 323, and the first through hole 323 is configured to communicate a space on the side of the connecting portion 32 which faces away from the electrode assembly 10 with an interior space of the housing 20.

The first through hole 323 runs through the connecting portion 32 in the thickness direction of the connecting portion 32. One or more first through holes 323 may be provided.

When the connecting portion 32 is welded to the current collecting member 40, the first through hole 323 can function to release welding stresses and reduce the risk of cracking of the connecting portion 32.

During forming of the battery cell 7, the first through hole 323 may be used in a plurality of forming procedures. For example, the first through hole 323 may be used in a liquid injection procedure, a formation procedure or other procedures.

Specifically, the first through hole 323 is used for injecting an electrolyte into the interior space of the housing 20. When liquid injection is required, a liquid injection head of a liquid injection device presses against the connecting portion 32, and then the liquid injection head injects the electrolyte into the housing 20 through the first through hole 323.

During forming of the battery cell 7, a gas is generated in the housing 20, and the first through hole 323 may also be used to communicate with an external negative pressure device, so as to pump out the gas in the housing 20.

In some embodiments, an axis of the first through hole 323 coincides with the axis of the electrode lead-out hole 221.

In some embodiments, the current collecting member 40 is provided with a second through hole 45, and the second through hole 45 is configured to be arranged opposite to the first through hole 323 such that the electrolyte is capable of flowing into the interior space of the housing 20 through the second through hole 45.

A projection of the first through hole 323 in the first direction X at least partially overlaps with that of the second through hole 45 in the first direction X. An aperture of the second through hole 45 is not limited in this embodiment, and may be greater than, equal to or less than an aperture of the first through hole 323.

In this embodiment, the second through hole 45 opposite to the first through hole 323 is provided in the current collecting member 40, such that the blocking of the electrolyte by the current collecting member 40 during the liquid injection can be reduced, and the electrolyte can flow into the housing 20 smoothly, thereby improving the efficiency of infiltrating the electrode assembly 10.

In some embodiments, the projection of the first through hole 323 in the first direction X is located within the projection of the second through hole 45 in the first direction X. In this embodiment, the current collecting member 40 may be prevented from blocking the first through hole 323 in the first direction X, such that the electrolyte can smoothly flow into the housing 20.

The first through hole 323 is arranged coaxially with the second through hole 45, and the aperture of the second through hole 45 may be greater than or equal to that of the first through hole 323.

In some embodiments, the electrode assembly 10 is of a wound structure, the electrode assembly 10 is provided with a third through hole 14 at a winding center, the third through hole 14 runs through the electrode assembly 10 in the first direction X, and the third through hole 14 is arranged opposite to the first through hole 323 and the second through hole 45 in the first direction X such that the electrolyte is capable of flowing to the interior of the electrode assembly 10 through the third through hole 14.

The electrode assembly 10 is formed by winding the first electrode plate, the second electrode plate and the separator around a winding tool, and after the forming by winding, the winding tool is extracted from the electrode assembly 10. After the winding tool is extracted, the third through hole 14 is formed in the middle of the electrode assembly 10.

An axis of the third through hole 14 coincides with the central axis A of the electrode assembly 10. The third through hole 14 runs through the first tab 11, the main body portion 12 and the second tab 13 in the first direction X. The second annular portion 111 of the first tab 11 is an annular structure surrounding the outside of the third through hole 14, and the first annular portion 112 is an annular structure surrounding the outside of the second annular portion 111.

In the liquid injection procedure, the electrolyte can flow into the third through hole 14 through the first through hole 323 and the second through hole 45, and the electrolyte flowing into the third through hole 14 can infiltrate the electrode assembly 10 from inside, thereby improving the efficiency of infiltrating the electrode assembly 10.

In some embodiments, a projection of the second through hole 45 in the first direction X is located within that of the third through hole 14 in the first direction X. In this way, the blocking of the second through hole 45 by the first tab 11 can be reduced, and the electrolyte can smoothly flow into the third through hole 14.

In some embodiments, the first through hole 323, the second through hole 45, and the third through hole 14 are coaxially arranged. An aperture of the third through hole 14 may be greater than or equal to that of the second through hole 45.

In some embodiments, the connecting portion 32 comprises a groove 324, a bottom wall of the groove 324 is formed with the second welded portion W2, and the groove 324 is configured to be recessed from a first outer surface 322 of the connecting portion 32 in a direction toward the electrode assembly 10 such that a gap is formed between the first outer surface 322 and the bottom wall of the groove 324.

The groove 324 is recessed relative to the first outer surface 322 in the direction toward the current collecting member 40. In this embodiment, the groove 324 is provided in the connecting portion 32, so as to form a stepped structure on the connecting portion 32.

A portion between the bottom wall of the groove 324 and the first inner surface 321 is configured for welding to the current collecting member 40 to form the second welded portion W2. The first through hole 323 extends from the bottom wall of the groove 324 to the first inner surface 321, so as to run through the connecting portion 32.

During producing the battery cell, an external device needs to cooperate with the connecting portion 32. A surface of the second welded portion W2 is uneven, and if the external device presses against the second welded portion W2, the external device is prone to being crushed by the second welded portion W2. In this embodiment, the groove 324 is provided to form the gap between the first outer surface 322 and the bottom wall of the groove 324. In this way, the first outer surface 322 can be used to support the external device, so as to separate the external device from the second welded portion W2, and to reduce the risk of the external device being crushed.

The external device may be a liquid injection device, a gas extraction device, a welding device or a device for battery cells.

For example, during liquid injection, the liquid injection head presses against the first outer surface 322, and the first outer surface 322 can support the liquid injection head, and fit with the liquid injection head to implement sealing therebetween, so as to reduce the risk of leakage of the electrolyte to the outside of the battery cell 7.

Figure 11:
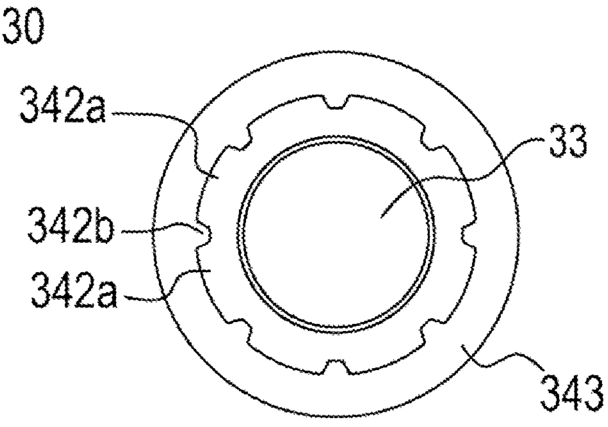
FIG. 11 is a schematic top view of an electrode terminal of a battery cell provided in some embodiments of the present application.

FIG. 11 is a schematic top view of an electrode terminal of a battery cell provided in some embodiments of the present application.

Referring to FIGS. 9 to 11, in some embodiments, the terminal body 34 comprises a columnar portion 341, a first limiting portion 342, and a second limiting portion 343, wherein the columnar portion 341 is at least partially located in the electrode lead-out hole 221, the first recess 31 is arranged in the columnar portion 341, the first limiting portion 342 and the second limiting portion 343 are both connected to and protrude from a lateral wall of the columnar portion 341, and the first limiting portion 342 and the second limiting portion 343 are respectively arranged on an outer side and an inner side of the cover 22 in the first direction, and are configured to clamp a part of the cover 22.

The first limiting portion 342 being arranged on an outer side of the cover 22 in the first direction means that the first limiting portion 342 is arranged, in the first direction, on a side of the cover 22 which faces away from the electrode assembly; and the second limiting portion 343 being arranged on an inner side of the cover 22 in the first direction means that the second limiting portion 343 is arranged, in the first direction, on the other side of the cover 22 facing the electrode assembly.

In the first direction, the first limiting portion 342 at least partially overlaps with the cover 22, and the second limiting portion 343 at least partially overlaps with the cover 22. The columnar portion 341 passes through the electrode lead-out hole 221 to connect the first limiting portion 342 and the second limiting portion 343 which are respectively located on two sides of the cover 22.

The first limiting portion 342 and the second limiting portion 343 clamp a part of the cover 22 on two sides to fix the terminal body 34 to the cover 22. The first limiting portion 342 and the second limiting portion 343 can directly clamp the cover 22, or may indirectly clamp the cover 22 by other members.

Optionally, the columnar portion 341 is cylindrical. The first limiting portion 342 and the second limiting portion 343 each are an annular structure surrounding the columnar portion 341.

In some embodiments, the battery cell 7 further comprises a first insulating member 60 and a second insulating member 70, the first insulating member 60 being at least partially arranged between the first limiting portion 342 and the cover 22, and the second insulating member 70 being at least partially arranged between the second limiting portion 343 and the cover 22. The first insulating member 60 and the second insulating member 70 are configured to insulate and isolate the terminal body 34 from the cover 22.

The first insulating member 60 and the second insulating member 70 each are an annular structure arranged around the columnar portion 341.

The first insulating member 60 can insulate and isolate the first limiting portion 342 from the cover 22, and the second insulating member 70 can insulate and isolate the second limiting portion 343 from the cover 22.

In some embodiments, one of the first insulating member 60 and the second insulating member 70 separates the columnar portion 341 from the cover 22. For example, a part of the first insulating member 60 extends into the electrode lead-out hole 221 to separate a hole wall of the electrode lead-out hole 221 from the columnar portion 341.

In some embodiments, the first insulating member 60 and the second insulating member 70 are of an integrally formed structure. Alternatively, in some other embodiments, the first insulating member 60 and the second insulating member 70 are provided separately and abut against each other.

In some embodiments, one of the first insulating member 60 and the second insulating member 70 is configured to seal the electrode lead-out hole. In some examples, the first limiting portion 342 and the cover 22 squeeze the first insulating member 60, and the first insulating member 60 is compressed and seals the electrode lead-out hole 221 from the outside. In some other examples, the second limiting portion 343 and the cover 22 squeeze the second insulating member 70, and the second insulating member 70 is compressed and seals the electrode lead-out hole 221 from the inside.

In some embodiments, the battery cell 7 further comprises a seal ring 80, and the seal ring 80 is sleeved on the columnar portion 341 and is configured to seal the electrode lead-out hole 221. Optionally, a part of the seal ring 80 extends into the electrode lead-out hole 221 to separate the hole wall of the electrode lead-out hole 221 from the columnar portion 341.

In some embodiments, a periphery of the first limiting portion 342 is provided with a plurality of protruding structures 342*a*, and the plurality of protruding structures 342*a* are spaced in a circumferential direction of the columnar portion 341.

Optionally, the plurality of protruding structures 342*a* may be equally spaced in the circumferential direction of the columnar portion 341.

The first limiting portion 342 has an edge-folded structure formed by outwardly folding over an end portion of the terminal body 34 which faces away from the electrode assembly.

Before the terminal body 34 is assembled to the housing, the first limiting portion 342 of the terminal body 34 has a generally cylindrical structure and is located at an upper end of the columnar portion 341, and a lateral wall of the first limiting portion 342 is flush with the lateral wall of the columnar portion 341. When the terminal body 34 is assembled to the housing, after the first limiting portion 342 passes through the electrode lead-out hole 221, the first limiting portion 342 is squeezed, such that the first limiting portion 342 is folded over outwardly, and the terminal body 34 is riveted to the cover 22.

Before the first limiting portion 342 is folded over, a plurality of spaced groove structures 342*b* are provided on an upper end of the first limiting portion 342. After the first limiting portion 342 is folded over, a plurality of protruding structures 342*a* spaced in the circumferential direction of the columnar portion 341 are formed, and the groove structures 342*b* are provided between adjacent protruding structures 342*a*. In this embodiment, the provision of the groove structures 342*b* and the protruding structures 342*a* reduces the difficulty in folding over the first limiting portion 342 and reduces stress concentration on the first limiting portion 342.

In some embodiments, the second limiting portion 343 is a limiting structure which is formed by pressing an end portion of the terminal body 34 facing the electrode assembly to outwardly extend the end portion of the terminal body 34 facing the electrode assembly. When the cover 22 and the terminal body 34 are assembled, the external device may press an end portion of the terminal body 34 facing the electrode assembly, and the end portion of the terminal body 34 facing the electrode assembly extends outwardly under the action of the pressure, so as to form a protruding second limiting portion 343.

In some embodiments, the terminal body 34 has a second outer surface 344 and a second inner surface 345 which are oppositely arranged in the first direction, and the first recess 31 is recessed from the second outer surface 344 to the first outer surface 322 of the connecting portion 32 in the direction toward the electrode assembly 10.

In some embodiments, the electrode terminal 30 comprises a sealing plate 33, and the sealing plate 33 is connected to the terminal body 34 and closes an opening of the first recess 31.

The sealing plate 33 may be entirely located outside the first recess 31, or may be partially accommodated in the first recess 31, as long as the sealing plate 33 can close the opening of the first recess 31.

The sealing plate 33 can protect the connecting portion 32 from the outside, reduce external impurities entering the first recess 31, reduce the risk of the connecting portion 32 being damaged by the external impurities, and improve the sealing performance of the battery cell 7.

In addition, the sealing plate 33 can further function to seal the first through hole 323. After the battery cell 7 is formed, the sealing plate 33 can reduce the risk of electrolyte leakage through the first through hole 323 and the first recess 31, and improve the sealing performance.

In some embodiments, a stepped surface 311 is provided on a side wall of the first recess 31, at least a part of the sealing plate 33 is accommodated in the first recess 31, and the stepped surface 311 is used to support the sealing plate 33.

The first recess 31 is a stepped recess that has a larger top than the bottom.

When the sealing plate 33 is assembled, the stepped surface 311 can support the sealing plate 33 and position the sealing plate 33, thereby simplifying an assembly process. At least a part of the sealing plate 33 is accommodated in the first recess 31, which can reduce an overall size of the electrode terminal 30 in the first direction, reduce a space occupied by the electrode terminal 30, and increase energy density.

In some embodiments, the sealing plate 33 is welded to the side wall of the first recess 31, so as to close the opening of the first recess 31.

In some embodiments, a gap is provided between the sealing plate 33 and the connecting portion 32 for avoiding the second welded portion W2.

The second welded portion W2 has an uneven surface, and if the sealing plate 33 presses against the second welded portion W2, the sealing plate 33 will wobble during assembly, which affects the sealing effect. In this embodiment, the gap is provided between the sealing plate 33 and the connecting portion 32 to enable the sealing plate 33 to avoid the second welded portion W2 and prevent the sealing plate 33 from being in direct contact with the second welded portion W2, thereby reducing wobbles of the sealing plate 33 during assembly and ensuring the sealing effect.

In some examples, the first recess 31 has a stepped structure, such that the sealing plate 33 abuts against the stepped surface 311 to form a gap between the sealing plate 33 and the connecting portion 32. In some other examples, the connecting portion 32 may also be provided as a stepped structure, such that the sealing plate 33 can abut against the connecting portion 32, and the groove 324 in the connecting portion 32 forms the gap between the sealing plate 33 and the connecting portion 32.

In some embodiments, the connecting portion 32 is arranged at the end of the terminal body 34 facing the electrode assembly 10, and the first inner surface 321 of the connecting portion 32 is flush with the second inner surface 345.

The second inner surface 345 is the surface of the terminal body 34 facing the electrode assembly 10. The first inner surface 321 of the connecting portion 32 constitutes a part of the second inner surface 345. In this way, the terminal body 34 may fit the current collecting member 40 having a flat plate structure. In this embodiment, the connecting portion 32 can be attached to the current collecting member 40 simply by attaching the third outer surface 43 of the current collecting member 40 to the second inner surface 345, in order to facilitate the welding of the connecting portion 32 to the current collecting member 40.

Figure 12:
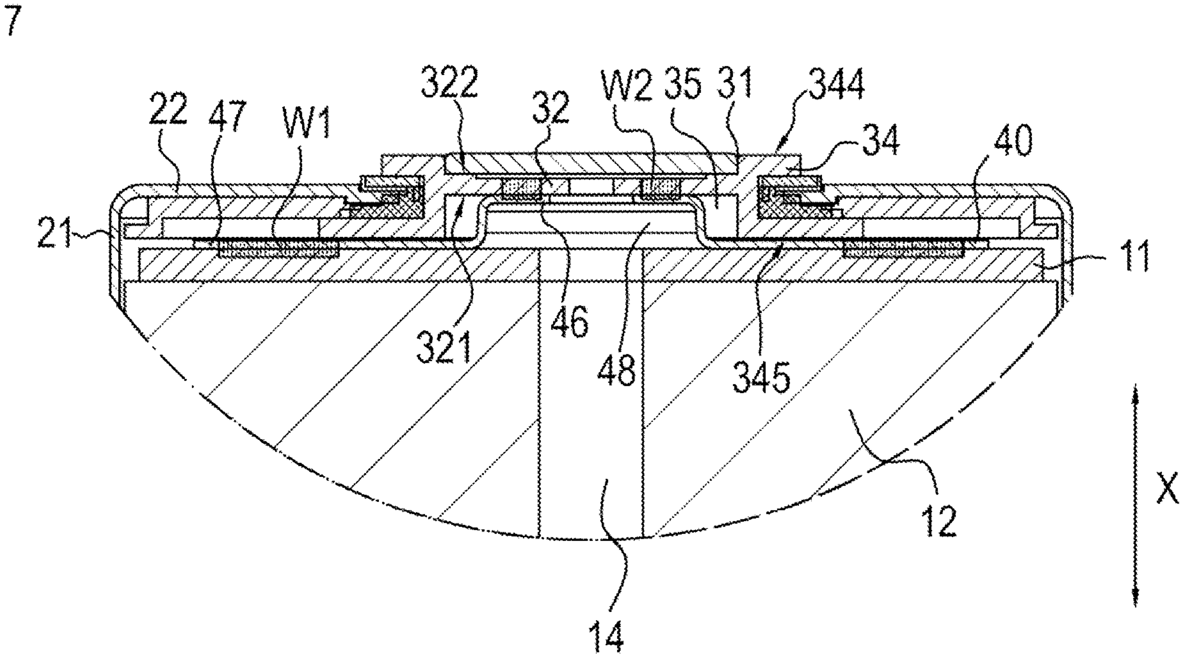
FIG. 12 is a partial schematic cross-sectional view of a battery cell provided in some other embodiments of the present application.

FIG. 12 is a partial schematic cross-sectional view of a battery cell provided in some other embodiments of the present application.

As shown in FIG. 12, in some embodiments, the terminal body 34 has a second outer surface 344 and a second inner surface 345 which are arranged in the first direction X, and the first recess 31 is recessed from the second outer surface 344 to the first outer surface 322 of the connecting portion 32 in the direction toward the electrode assembly 10. The terminal body 34 further comprises a second recess 35, and the second recess 35 is recessed from the second inner surface 345 to the first inner surface 321 of the connecting portion 32 in a direction away from the electrode assembly.

In this embodiment of the present application, the provision of both the first recess 31 and the second recess 35 reduces the thickness of the connecting portion 32, which can reduce requirements for the depth of the first recess 31 and simplify a forming process. The provision of the second recess 35 may also increase the interior space of the battery cell 7, thereby increasing the energy density.

In some embodiments, the current collecting member 40 comprises a terminal connecting portion 46 and a tab connecting portion 47 surrounding the outside of the terminal connecting portion 46, the terminal connecting portion 46 protruding relative to the tab connecting portion 47 and extending into the second recess 35 in such a way that the top of the terminal connecting portion 46 abuts against the first inner surface 321 of the connecting portion 32.

The tab connecting portion 47 is located between the cover 22 and the first tab 11, and is welded to the first annular portion to form the first welded portion W1. Optionally, the tab connecting portion 47 may have a annular flat plate structure.

In some embodiments, the current collecting member 40 is provided with a fourth recess 48 at a position corresponding to the terminal connecting portion 46, and the fourth recess 48 is recessed relative to a surface of the tab connecting portion 47 facing the first tab 11. The fourth recess 48 can reduce a space occupied by the terminal connecting portion 46 and reduce the weight of the current collecting member 40. For example, the terminal connecting portion 46 and the fourth recess 48 are formed by stamping the current collecting member 40.

Figure 13:
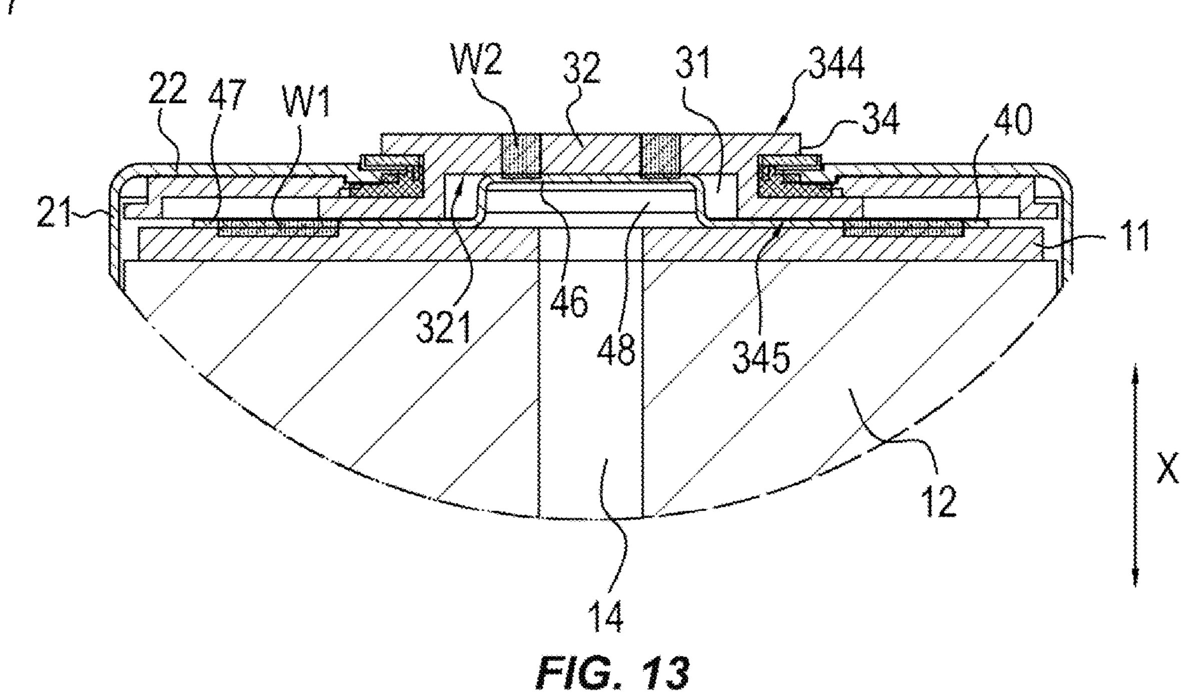
FIG. 13 is a partial schematic cross-sectional view of a battery cell provided in some other embodiments of the present application.

FIG. 13 is a partial schematic cross-sectional view of a battery cell provided in some other embodiments of the present application.

As shown in FIG. 13, in some embodiments, the terminal body 34 has a second outer surface 344 and a second inner surface 345 which are arranged in the first direction X, and the first recess 31 is recessed from the second inner surface 345 to the first inner surface 321 of the connecting portion 32 in the direction away from the electrode assembly.

In this embodiment, the first recess 31 is provided on an inner side of the terminal body 34, which can ensure the flatness and area of the second outer surface 344 and facilitate connection of the terminal body 34 to an external busbar component. The provision of the first recess 31 on the inner side of the terminal body 34 can also increase the interior space of the battery cell 7, thereby increasing the energy density.

In some embodiments, the current collecting member 40 comprises a terminal connecting portion 46 and a tab connecting portion 47 surrounding the outside of the terminal connecting portion 46, the terminal connecting portion 46 protruding relative to the tab connecting portion 47 and extending into the first recess 31 in such a way that the top of the terminal connecting portion 46 abuts against the first inner surface 321 of the connecting portion 32.

The tab connecting portion 47 is located between the cover 22 and the first tab 11, and is welded to the first annular portion to form the first welded portion W1. Optionally, the tab connecting portion 47 may have a annular flat plate structure.

In some embodiments, the current collecting member 40 is provided with a fourth recess 48 at a position corresponding to the terminal connecting portion 46, and the fourth recess 48 is recessed relative to a surface of the tab connecting portion 47 facing the first tab 11. The fourth recess 48 can reduce a space occupied by the terminal connecting portion 46 and reduce the weight of the current collecting member 40. For example, the terminal connecting portion 46 and the fourth recess 48 are formed by stamping the current collecting member 40.

Figure 14:
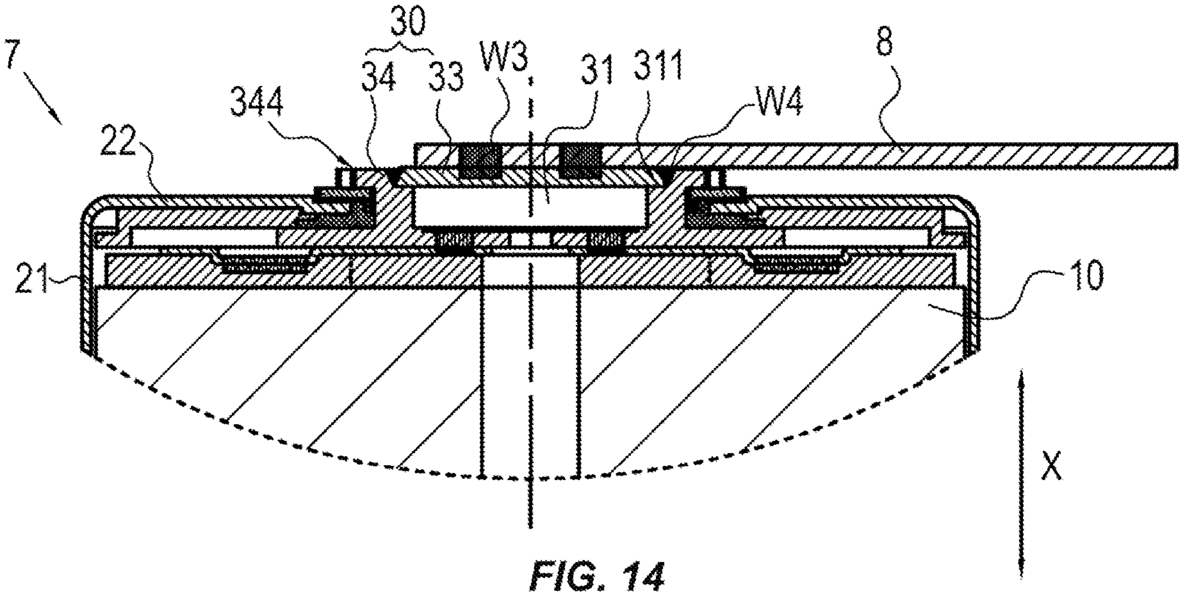
FIG. 14 is a schematic structural diagram of a battery cell provided in some embodiments of the present application which is connected to a busbar component.

FIG. 14 is a schematic structural diagram of a battery cell provided in some embodiments of the present application which is connected to a busbar component.

As shown in FIG. 14, in some embodiments, the terminal body 34 has a second outer surface 344 and a second inner surface 345 which are oppositely arranged in the first direction, and the first recess 31 is recessed from the second outer surface 344 to the first outer surface 322 of the connecting portion 32 in the direction toward the electrode assembly 10. The electrode terminal 30 further comprises a sealing plate 33, the sealing plate 33 is connected to the terminal body 34 and closes an opening of the first recess 31, and the sealing plate 33 is configured to be welded to a busbar component 8 of a battery to form a third welded portion W3.

In the battery, the battery cells 7 are electrically connected by means of the busbar component 8. The third welded portion W3 can reduce contact resistance between the sealing plate 33 and the busbar component 8 and improve the overcurrent capability.

Optionally, in the battery, the busbar component 8 connects a sealing plate 33 of one of the battery cells 7 to a cover of another of the battery cells to connect the two battery cells in series.

In some embodiments, at least a part of the sealing plate 33 protrudes from the second outer surface 344 of the terminal body 34.

When the busbar component 8 needs to be welded to the sealing plate 33, the busbar component 8 is first attached to an upper surface of the sealing plate 33 (i.e., an outer surface of the sealing plate 33 which face away from the connecting portion), and then the busbar component 8 is welded to the sealing plate 33.

The at least a part of the sealing plate 33 protrudes from the second outer surface 344 to prevent the second outer surface 344 from interfering with the attachment between the sealing plate 33 and the busbar component 8 and to ensure close attachment of the busbar component 8 to the sealing plate 33.

In some embodiments, at least a part of the sealing plate 33 is accommodated in the first recess 31, and the side wall of the first recess 31 is provided with a stepped surface for supporting the sealing plate 33. The sealing plate 33 is welded to the side wall of the first recess 31 to form a fourth welded portion W4, and the fourth welded portion W4 is configured to seal the opening of the first recess 31.

The fourth welded portion W4 surrounds the entire periphery of the sealing plate 33 to seal the gap between the sealing plate 33 and the side wall of the first recess 31 and to improve the sealing performance of the battery cell 7.

In some embodiments, in the direction away from the connecting portion, the fourth welded portion W4 is beyond the upper surface of the sealing plate 33, which can prevent the fourth welded portion W4 from interfering with the busbar component 8.

In some embodiments, the third welded portion W3 is entirely located in a region enclosed by the fourth welded portion W4.

The fourth welded portion W4 surrounds the outside of the third welded portion W3 and is separated from the third welded portion W3 by a predetermined distance.

In this embodiment, when the busbar component 8 is welded to the sealing plate 33, an intersection of the third welded portion W3 with the fourth welded portion W4 can be avoided to reduce the risk of pseudo soldering.

Figure 15:
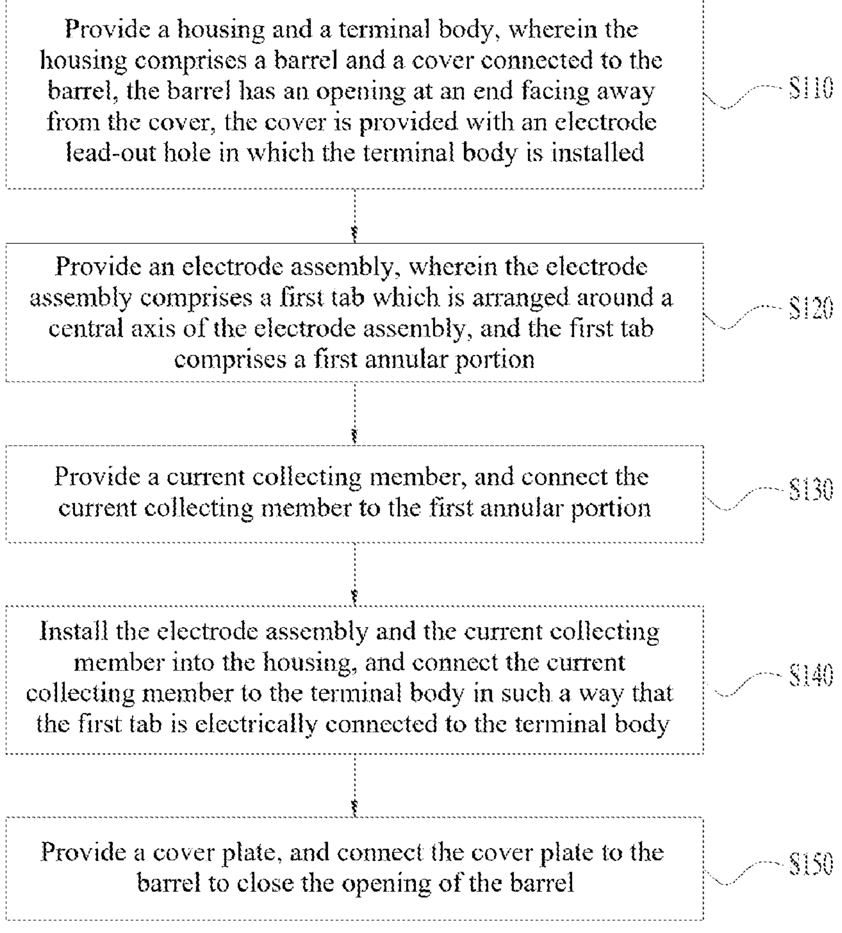
FIG. 15 is a schematic flowchart of a method for manufacturing a battery cell provided in some embodiments of the present application.

FIG. 15 is a schematic flowchart of a method for manufacturing a battery cell provided in some embodiments of the present application.

As shown in FIG. 15, the method for manufacturing a battery cell according to this embodiment of the present application comprises the following steps.

At step S110, a housing and a terminal body are provided, wherein the housing comprises a barrel and a cover connected to the barrel, the barrel has an opening at an end facing away from the cover, and the cover is provided with an electrode lead-out hole in which the terminal body is installed.

At step S120, an electrode assembly is provided, wherein the electrode assembly comprises a first tab, the first tab is arranged around a central axis of the electrode assembly, and the first tab comprises a first annular portion.

At step S130, a current collecting member is provided, and the current collecting member is connected to the first annular portion.

At step S140, the electrode assembly and the current collecting member are installed into the housing, and the current collecting member is connected to the terminal body in such a way that the first tab is electrically connected to the terminal body.

At step S150, a cover plate is provided, and the cover plate is connected to the barrel to close the opening of the barrel.

The barrel is arranged around a periphery of the electrode assembly, the central axis extends in a first direction and passes through the electrode lead-out hole, the first annular portion is arranged opposite to the cover, a projection of the first annular portion in the first direction does not overlap with a projection of the electrode lead-out hole in the first direction, and the current collecting member is at least partially located between the cover and the first annular portion.

In some embodiments, the terminal body is provided with a first recess, and the terminal body is formed with a connecting portion at the bottom of the first recess.

Step S140 comprises the following steps.

At step S141, the electrode assembly and the current collecting member are installed into the housing, and the current collecting member presses against the connecting portion.

At step S142, an external welding device acts on a surface of the connecting portion which faces away from the current collecting member so as to weld the connecting portion to the current collecting member.

The external welding device welds the connecting portion to the current collecting member to form a second welded portion. In this embodiment, the provision of the first recess reduces the thickness of the connecting portion, which can reduce the welding power required for welding the connecting portion to the current collecting member, reduce heat generation, and reduce the risk of other members being burned. During welding from the outside, the housing can prote"t th' electrode assembly, and prevent metal particles generated by welding from sputtering to the electrode assembly, thereby reducing the risk of a short circuit.

In some embodiments, the terminal body has a second outer surface and a second inner surface which are oppositely arranged in the first direction, and the first recess is recessed from a second outer surface to a first outer surface of the connecting portion in a direction toward the electrode assembly. The method for manufacturing a battery cell further comprises step S160 in which a sealing plate is provided, the sealing plate is at least partially placed into the first recess, and the sealing plate is welded to a side wall of the first recess to close an opening of the first recess.

The sealing plate can protect the connecting portion from the outside, reduce external impurities entering the first recess, reduce the risk of the connecting portion being damaged by the external impurities, and improve the sealing performance of the battery cell.

It should be noted that for a related structure of the battery cell manufactured by the foregoing method for manufacturing a battery cell, reference may be made to the battery cells provided in the foregoing embodiments.

When a battery cell is assembled based on the foregoing method for manufacturing a battery cell, it is not necessary to sequentially perform the foregoing steps, that is to say, the steps may be performed in the order mentioned in the embodiments, or the steps may be performed in an different order from the order mentioned in the embodiments, or several steps are performed simultaneously. For example, steps S110 and S120 may be performed in a random order, or may be performed simultaneously.

Figure 16:
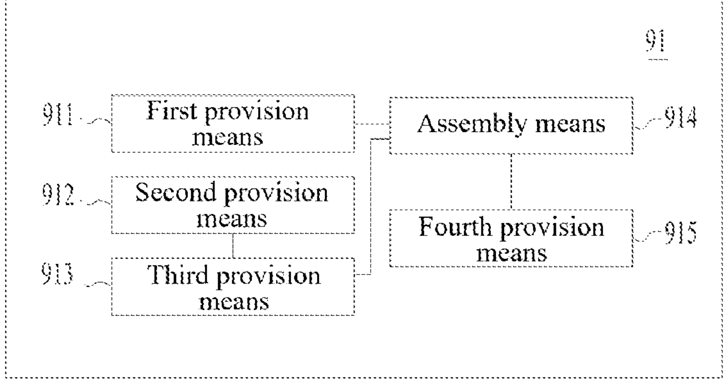
FIG. 16 is a schematic block diagram of a system for manufacturing a battery cell provided in some embodiments of the present application.

FIG. 16 is a schematic block diagram of a system for manufacturing a battery cell provided in some embodiments of the present application.

As shown in FIG. 16, the manufacturing system 91 for manufacturing a battery cell according to this embodiment of the present application comprises:

- a first provision means 911 configured to provide a housing and a terminal body, wherein the housing comprises a barrel and a cover connected to the barrel, the barrel has an opening at an end facing away from the cover, and the cover is provided with an electrode lead-out hole in which the terminal body is installed;
- a second provision means 912 configured to provide an electrode assembly, wherein the electrode assembly comprises a first tab, the first tab is arranged around a central axis of the electrode assembly, and the first tab comprises a first annular portion;
- a third provision means 913 configured to provide a current collecting member and connect the current collecting member to the first annular portion;
- an assembly means 914 configured to install the electrode assembly and the current collecting member into the housing and connect the current collecting member to the terminal body in such a way that the first tab is electrically connected to the terminal body; and
- a fourth provision means 915 configured to provide a cover plate and connect the cover plate to the barrel to close the opening of the barrel;

The barrel is arranged around a periphery of the electrode assembly, the central axis extends in a first direction and passes through the electrode lead-out hole, the first annular portion is arranged opposite to the cover, a projection of the first annular portion in the first direction does not overlap with a projection of the electrode lead-out hole in the first direction, and the current collecting member is at least partially located between the cover and the first annular portion.

For a related structure of the battery cell manufactured by the foregoing manufacturing system 91, reference may be made to the battery cells provided in the foregoing embodiments.

Figure 17:
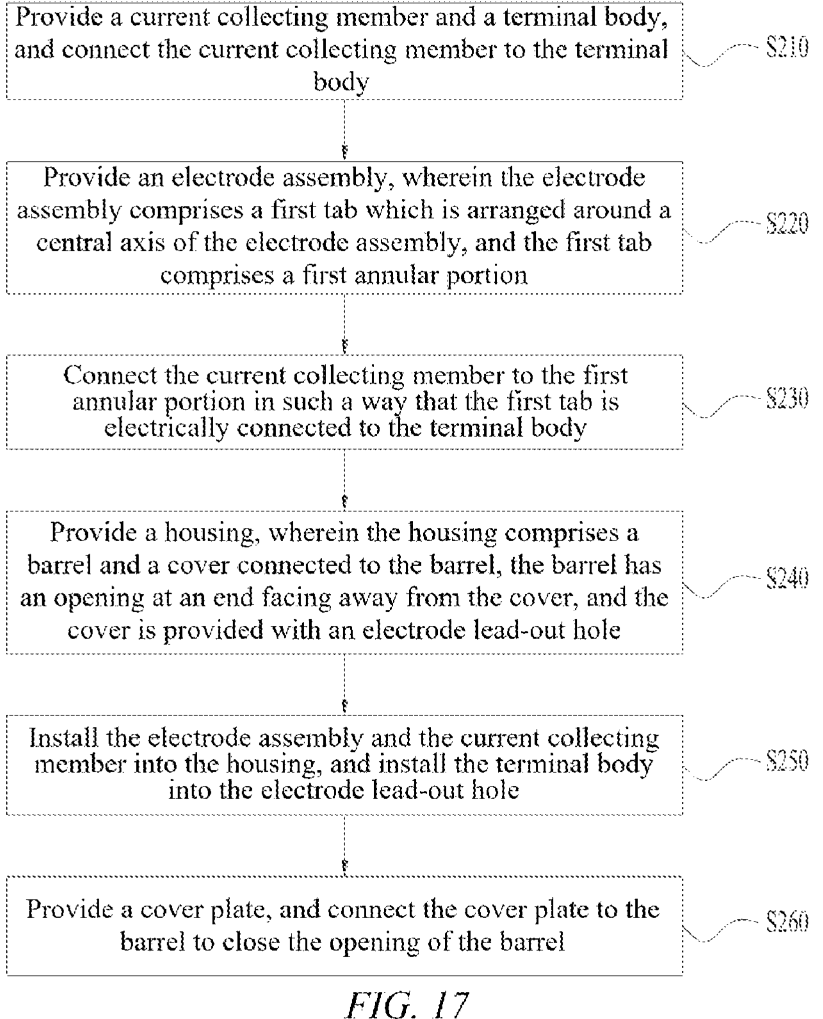
FIG. 17 is a schematic flowchart of a method for manufacturing a battery cell provided in some other embodiments of the present application.

FIG. 17 is a schematic flowchart of a method for manufacturing a battery cell provided in some other embodiments of the present application.

As shown in FIG. 17, the method for manufacturing a battery cell according to this embodiment of the present application comprises the following steps.

At step S210, a current collecting member and a terminal body are provided, and the current collecting member is connected to the terminal body.

At step S220, an electrode assembly is provided, wherein the electrode assembly comprises a first tab, the first tab is arranged around a central axis of the electrode assembly, and the first tab comprises a first annular portion.

At step S230, the current collecting member is connected to the first annular portion in such a way that the first tab is electrically connected to the terminal body.

At step S240, a housing is provided, wherein the housing comprises a barrel and a cover connected to the barrel, the barrel has an opening at an end facing away from the cover, and the cover is provided with an electrode lead-out hole.

At step S250, the electrode assembly and the current collecting member are installed into the housing, and the terminal body is installed into the electrode lead-out hole.

At step S260, a cover plate is provided, and the cover plate is connected to the barrel to close the opening of the barrel.

The barrel is arranged around a periphery of the electrode assembly, the central axis extends in a first direction and passes through the electrode lead-out hole, the first annular portion is arranged opposite to the cover, a projection of the first annular portion in the first direction does not overlap with a projection of the electrode lead-out hole in the first direction, and the current collecting member is at least partially located between the cover and the first annular portion.

In some embodiments, step S250 comprises the following steps.

At step S251, the electrode assembly and the current collecting member are installed into the housing, and an end portion of the terminal body which faces away from the electrode assembly extends outside the cover through the electrode lead-out hole.

At step S252, an end portion of the terminal body which faces away from the electrode assembly is folded over outwardly to form an edge-folded structure, so as to install the terminal body into the electrode lead-out hole and fix the terminal body to the cover.

The edge-folded structure formed by outwardly folding over the terminal body may be a first limiting portion.

In this embodiment, the terminal body can be fixed to the cover plate by means of a process for folding over the end portion of the terminal body, thereby simplifying a process of assembling the terminal body with the cover.

In some other embodiments, step S250 comprises the following steps.

At step S253, the electrode assembly and the current collecting member are installed into the housing, and an end portion of the terminal body which faces away from the electrode assembly extends outside the cover through the electrode lead-out hole.

At step S254, the end portion of the terminal body which faces away from the electrode assembly is squeezed to force the end portion to extend outwardly to form a limiting structure for fixing the terminal body to the cover.

The limiting structure formed by squeezing may be a first limiting portion.

In this embodiment, the terminal body can be fixed to the cover plate by squeezing the end portion of the terminal body, thereby simplifying a process of assembling the terminal body with the cover.

It should be noted that for a related structure of the battery cell manufactured by the foregoing method for manufacturing a battery cell, reference may be made to the battery cells provided in the foregoing embodiments.

In the battery cell manufactured by the foregoing method for manufacturing a battery cell, the first recess and the sealing plate may be dispensed with.

When a battery cell is assembled based on the foregoing method for manufacturing a battery cell, it is not necessary to sequentially perform the foregoing steps, that is to say, the steps may be performed in the order mentioned in the embodiments, or the steps may be performed in an different order from the order mentioned in the embodiments, or several steps are performed simultaneously. For example, steps S210 and S220 may be performed in a random order, or may be performed simultaneously.

Figure 18:
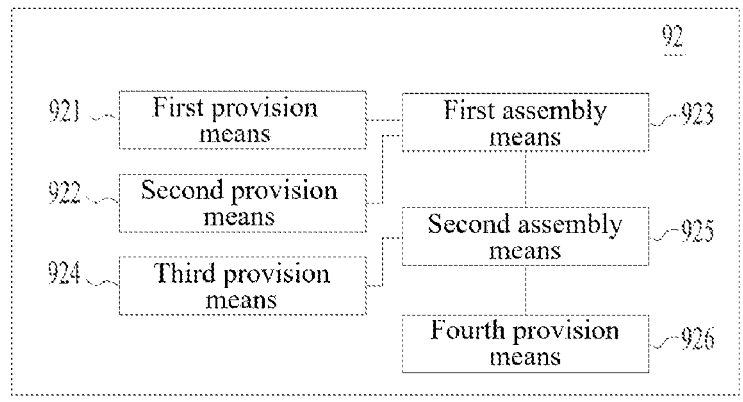
FIG. 18 is a schematic block diagram of a system for manufacturing a battery cell provided in some other embodiments of the present application.

FIG. 18 is a schematic block diagram of a system for manufacturing a battery cell provided in some other embodiments of the present application.

As shown in FIG. 18, the system 92 for manufacturing a battery cell according to this embodiment of the present application comprises:

- a first provision means 921 configured to provide a current collecting member and a terminal body and connect the current collecting member to the terminal body;
- a second provision means 922 configured to provide an electrode assembly, wherein the electrode assembly comprises a first tab, the first tab is arranged around a central axis of the electrode assembly, and the first tab comprises a first annular portion;
- a first assembly means 923 configured to connect the current collecting member to the first annular portion in such a way that the first tab is electrically connected to the terminal body;
- a third provision means 924 configured to provide a housing, wherein the housing comprises a barrel and a cover connected to the barrel, the barrel has an opening at an end facing away from the cover, and the cover is provided with an electrode lead-out hole;
- a second assembly means 925 configured to install the electrode assembly and the current collecting member into the housing and install the terminal body into the electrode lead-out hole; and
- a fourth provision means 926 configured to provide a cover plate and connect the cover plate to the barrel to close the opening of the barrel;

The barrel is arranged around a periphery of the electrode assembly, the central axis extends in a first direction and passes through the electrode lead-out hole, the first annular portion is arranged opposite to the cover, a projection of the first annular portion in the first direction does not overlap with a projection of the electrode lead-out hole in the first direction, and the current collecting member is at least partially located between the cover and the first annular portion.

For a related structure of the battery cell manufactured by the foregoing manufacturing system 92, reference may be made to the battery cells provided in the foregoing embodiments.

It should be noted that the embodiments in the present application and features in the embodiments may be combined with each other without conflicts.

Finally, it should be noted that the above embodiments are merely used for illustrating rather than limiting the technical solutions of the present application. Although the present application has been illustrated in detail with reference to the foregoing embodiments, it should be understood by those of ordinary skill in the art that the technical solutions described in the foregoing embodiments may still be modified, or some of the technical features therein may be equivalently substituted, but these modifications or substitutions do not make the essence of corresponding technical solutions depart from the spirit and scope of the technical solutions of the embodiments of the present application.

The invention claimed is:

1. A battery cell, comprising:

an electrode assembly comprising a first tab arranged around a central axis of the electrode assembly;

a housing configured to accommodate the electrode assembly, wherein the housing comprises a barrel and a cover connected to the barrel, the cover and the barrel are of an integrally formed structure, the barrel is arranged around a periphery of the electrode assembly, the barrel has an opening at an end facing away from the cover, the cover is provided with an electrode lead-out hole, the central axis extends in a first direction and passes through the electrode lead-out hole, the first tab comprises a first annular portion, the first annular portion is arranged opposite to the cover, and a projection of the first annular portion in the first direction does not overlap with a projection of the electrode lead-out hole in the first direction;

a cover plate for closing the opening of the barrel;

an electrode terminal installed in the electrode lead-out hole, wherein the electrode terminal comprises a terminal body, and the terminal body is provided with a first recess; and a current collecting member which is at least partially located between the cover and the first annular portion, wherein the current collecting member is configured to connect the first annular portion to the electrode terminal in such a way that the first tab is electrically connected to the electrode terminal;

wherein one of the following is met:

the first annular portion is welded to the current collecting member to form a first welded portion that is annular and is arranged around the central axis, and a projection of the first welded portion in the first direction does not overlap with a projection of the electrode lead-out hole in the first direction; or the first annular portion is welded to the current collecting member to form a plurality of first welded portions, and the plurality of first welded portions are spaced in a circumferential direction of the first annular portion, and a projection of each one of the plurality of first welded portions in the first direction does not overlap with a projection of the electrode lead-out hole in the first direction, wherein the terminal body of the electrode terminal is formed with a connecting portion at a bottom of the first recess, and the connecting portion is welded to the current collecting member to form a second welded portion, the connecting portion comprises a groove, a bottom wall of the groove is formed with the second welded portion, and the groove is configured to be recessed from a first outer surface of the connecting portion in a direction toward the electrode assembly such that a gap is formed between the first outer surface of the connecting portion and the bottom wall of the groove.

2. The battery cell according to claim 1, wherein a cross section of the first tab perpendicular to the first direction is annular; and the first tab has an outer radius R, when the first annular portion is welded to the current collecting member to form the first welded portion, a minimum distance D between the first welded portion and the central axis in a second direction is provided, R and D meet: $0.2 \leq D/R \leq 0.8$, wherein the second direction is a radial direction of the first tab, and R and D have the same measurement units.

3. The battery cell according to claim 1, wherein the current collecting member is provided with a bump on a side facing the first tab, and the bump is welded to the first annular portion to form the first welded portion.

4. The battery cell according to claim 1, wherein the first tab further comprises a second annular portion arranged opposite to the electrode lead-out hole in the first direction, and the first annular portion surrounds an outside of the second annular portion; and at least a part of the second annular portion abuts against the current collecting member.

5. The battery cell according to claim 1, wherein the terminal body has a second outer surface and a second inner surface which are oppositely arranged in the first direction, and the first recess is recessed from the second outer surface to the first outer surface of the connecting portion in a direction toward the electrode assembly.

6. The battery cell according to claim 5, wherein the electrode terminal further comprises a sealing plate which is connected to the terminal body and which closes an opening of the first recess.

7. The battery cell according to claim 6, wherein a stepped surface is provided on a side wall of the first recess, at least a part of the sealing plate is accommodated in the first recess, and the stepped surface is used to support the sealing plate.

8. The battery cell according to claim 6, wherein a gap is provided between the sealing plate and the connecting portion for avoiding the second welded portion.

9. The battery cell according to claim 5, wherein the electrode terminal further comprises a sealing plate which is connected to the terminal body and which closes an opening of the first recess, and the sealing plate is configured to be welded to a busbar component of a battery to form a third welded portion.

10. The battery cell according to claim 9, wherein at least a part of the sealing plate protrudes from the second outer surface of the terminal body.

11. The battery cell according to claim 1, wherein the electrode assembly further comprises a second tab which is arranged around the central axis of the electrode assembly;

the first tab and the second tab are respectively arranged at two ends of the electrode assembly in the first direction; and the barrel is configured to connect the second tab to the cover in such a way that the second tab is electrically connected to the cover.

12. The battery cell according to claim 11, wherein the second tab is a negative tab, and a bulk material of the housing is steel.

13. A battery, comprising a plurality of battery cells according to claim 1 and busbar components, wherein the busbar components are configured to electrically connect at least two of the battery cells.

14. A power consuming device, comprising the battery according to claim 13, wherein the battery is configured to provide electric energy.

15. The battery cell according to claim 1, wherein the second welded portion extends from a first outer surface of the connecting portion to the current collecting member in a thickness direction of the connecting portion, and the second welded portion is separated from a surface of the current collecting member which faces away from the connecting portion by a predetermined distance, so as to prevent the current collecting member from being melted through.

16. The battery cell according to claim 1, wherein the connecting portion is provided with a first through hole running through the connecting portion in a thickness direction of the connecting portion, the first through hole is configured to communicate a space on a side of the connecting portion which faces away from the electrode assembly with an interior space of the housing.

17. The battery cell according to claim 16, wherein the current collecting member is provided with a second through hole configured to be arranged opposite to the first through hole, the electrode assembly is provided with a third through hole arranged opposite to the first through hole and the second through hole in the first direction, such that an electrolyte is capable of flowing into an interior space of the housing through the first through hole, the second through hole, and the third through hole.

18. The battery cell according to claim 6, wherein the sealing plate is welded to a side wall of the first recess to form a fourth welded portion configured to seal the opening of the first recess, the fourth welded portion surrounds an entire periphery of the sealing plate to seal a gap between the sealing plate and the side wall of the first recess.

* * * * *